(12) United States Patent
Rusanovskyy et al.

(10) Patent No.: US 10,778,978 B2
(45) Date of Patent: Sep. 15, 2020

(54) SYSTEM AND METHOD OF CROSS-COMPONENT DYNAMIC RANGE ADJUSTMENT (CC-DRA) IN VIDEO CODING

(71) Applicant: QUALCOMM Incorporated, San Diego, CA (US)

(72) Inventors: Dmytro Rusanovskyy, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/999,393

(22) Filed: Aug. 20, 2018

(65) Prior Publication Data
US 2019/0068969 A1 Feb. 28, 2019

Related U.S. Application Data

(60) Provisional application No. 62/548,236, filed on Aug. 21, 2017.

(51) Int. Cl.
| | | |
|---|---|---|
| H04N 19/124 | (2014.01) | |
| H04N 19/85 | (2014.01) | |
| H04N 19/117 | (2014.01) | |
| H04N 19/98 | (2014.01) | |
| H04N 19/186 | (2014.01) | |
| H04N 19/169 | (2014.01) | |

(52) U.S. Cl.
CPC ......... *H04N 19/124* (2014.11); *H04N 19/117* (2014.11); *H04N 19/186* (2014.11); *H04N 19/1887* (2014.11); *H04N 19/85* (2014.11); *H04N 19/98* (2014.11)

(58) Field of Classification Search
None
See application file for complete search history.

(56) References Cited

U.S. PATENT DOCUMENTS

| 10,419,767 B2 * | 9/2019 | Stessen | H04N 9/67 |
| 2006/0268166 A1 * | 11/2006 | Bossen | H04N 19/70 |
| | | | 348/390.1 |
| 2007/0064162 A1 * | 3/2007 | Yamamoto | G09G 3/2092 |
| | | | 348/790 |

(Continued)

OTHER PUBLICATIONS

International Search Report and Written Opinion—PCT/US2018/047336—ISA/EPO—dated Dec. 5, 2018.

(Continued)

*Primary Examiner* — Jayanti K Patel
*Assistant Examiner* — Stefan Gadomski
(74) *Attorney, Agent, or Firm* — Shumaker & Sieffert, P.A.

(57) ABSTRACT

A method of processing video data including receiving video data, determining luma scale parameters for each of a plurality of ranges of codeword values for luminance components of the video data, performing a dynamic range adjustment process on the luminance components using the luma scale parameters, determining chroma scale parameters for chrominance components of the video data using a function of the luma scale parameters, and performing a dynamic range adjustment process on the chrominance components of the video data using the chroma scale parameters.

28 Claims, 20 Drawing Sheets

(56) References Cited

U.S. PATENT DOCUMENTS

| | | | | |
|---|---|---|---|---|
| 2008/0247665 | A1* | 10/2008 | Hsu | G06T 5/009 382/274 |
| 2011/0194618 | A1* | 8/2011 | Gish | H04N 19/59 375/240.25 |
| 2012/0281009 | A1* | 11/2012 | Ward | H04N 5/2355 345/589 |
| 2013/0335439 | A1* | 12/2013 | Jeong | G09G 5/026 345/590 |
| 2014/0003497 | A1* | 1/2014 | Sullivan | H04N 19/124 375/240.03 |
| 2014/0003498 | A1* | 1/2014 | Sullivan | H04N 19/70 375/240.03 |
| 2014/0341468 | A1* | 11/2014 | Paris | H04N 19/30 382/167 |
| 2015/0103919 | A1* | 4/2015 | Hattori | H04N 19/124 375/240.25 |
| 2015/0172661 | A1* | 6/2015 | Dong | H04N 19/13 375/240.03 |
| 2015/0245043 | A1* | 8/2015 | Greenebaum | H04N 19/124 375/240.25 |
| 2015/0256807 | A1* | 9/2015 | Honji | H04N 9/77 348/453 |
| 2016/0150145 | A1* | 5/2016 | Van Der Vleuten | H04N 5/202 348/234 |
| 2016/0205371 | A1* | 7/2016 | Wallace | G06T 5/007 348/571 |
| 2016/0205372 | A1* | 7/2016 | Liu | H04N 5/20 |
| 2016/0301959 | A1* | 10/2016 | Oh | H04N 21/234327 |
| 2016/0358584 | A1* | 12/2016 | Greenebaum | G06T 11/001 |
| 2016/0366449 | A1* | 12/2016 | Stessen | H04N 9/77 |
| 2017/0064334 | A1* | 3/2017 | Minoo | H04N 19/117 |
| 2017/0078706 | A1* | 3/2017 | Van Der Vleuten | G06T 5/009 |
| 2017/0085894 | A1* | 3/2017 | Ramasubramonian | H04N 19/46 |
| 2017/0085896 | A1* | 3/2017 | Ramasubramonian | H04N 19/70 |
| 2017/0103729 | A1* | 4/2017 | Huang | H04N 9/68 |
| 2017/0105014 | A1* | 4/2017 | Lee | H04N 19/30 |
| 2017/0111643 | A1* | 4/2017 | Bugdayci Sansli | H04N 19/184 |
| 2017/0142446 | A1* | 5/2017 | Leleannec | H04N 19/136 |
| 2017/0256039 | A1* | 9/2017 | Hsu | G06T 5/009 |
| 2017/0324959 | A1* | 11/2017 | Olivier | H04N 19/136 |
| 2017/0330529 | A1* | 11/2017 | Van Mourik | H04N 5/20 |
| 2018/0007372 | A1* | 1/2018 | Lasserre | H04N 19/00 |
| 2018/0007374 | A1* | 1/2018 | Atkins | H04N 19/132 |
| 2018/0007392 | A1* | 1/2018 | Lasserre | H04N 19/98 |
| 2018/0027252 | A1* | 1/2018 | Lasserre | H04N 19/30 382/233 |
| 2018/0103253 | A1* | 4/2018 | Lu | H04N 19/186 |
| 2018/0124400 | A1* | 5/2018 | He | H04N 19/46 |
| 2018/0131841 | A1* | 5/2018 | Mahmalat | H04N 1/6058 |
| 2018/0160038 | A1* | 6/2018 | Thumpudi | H04N 5/23229 |
| 2018/0167615 | A1* | 6/2018 | Kim | H04N 19/186 |
| 2018/0255302 | A1* | 9/2018 | Galpin | H04N 19/159 |
| 2018/0278934 | A1* | 9/2018 | Andersson | H04N 19/196 |
| 2018/0309995 | A1* | 10/2018 | He | H04N 19/31 |
| 2018/0352257 | A1* | 12/2018 | Leleannec | G06T 5/10 |
| 2018/0359480 | A1* | 12/2018 | Xiu | H04N 19/85 |
| 2019/0052908 | A1* | 2/2019 | Mertens | H04N 19/186 |
| 2019/0075229 | A1* | 3/2019 | Kamiya | H04N 5/20 |
| 2019/0082186 | A1* | 3/2019 | Van Der Vleuten | H04N 9/67 |
| 2019/0098317 | A1* | 3/2019 | Lu | H04N 19/186 |
| 2019/0124368 | A1* | 4/2019 | Francois | H04N 19/30 |
| 2019/0130542 | A1* | 5/2019 | Tichelaar | G06T 5/007 |
| 2019/0132600 | A1* | 5/2019 | Francois | H04N 19/30 |

OTHER PUBLICATIONS

Lasserre S., et al., "Technicolor's Response to CfE for HDR and WCG (Category 1)—Single Layer HDR Video Coding with SDR Backward Compatibility," ISO/IEC JTC1/SC29/WG11 MPEG2014/M36263r1, Jun. 2015, 21 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Wang, Ye-Kui, et al., "High Efficiency Video Coding (HEVC) Defect Report 2", 15, JCT-VC Meeting; Oct. 23 through Nov. 1, 2013; Geneva, CH; (Joint Collaborative Team on Video Coding (JCT-VC) of ITU-T Sg 16 WP 3 and ISO/IEC JTC 1/SC 29/WG 11); URL: http://wftp3.itu_int/av-arch/jctvc-site/, No. JCTVC-O1003_v2, 311 pp.

Ramasubramonian A K. et al., "HDR CE2.a-1: Report on LCS," Joint Collaborative Team on Video Coding (JCT-VC) of ITU-T SG 16 WP 3 and ISO/IEC JTC 1/SC 29/WG 11, 23rd Meeting, San Diego, US, JCTVC-W0101r1, Feb. 19-26, 2016, 7 pp.

Qualcomm Inc., "Dynamic Range Adjustment SEI to Enable High Dynamic Range Video Coding with Backward-Compatible Capability," International Telecommunication Union, Study Group 16, No. COM 16-C 1027-E, Sep. 2015, XP030100746, pp. 1-11.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.

ITU-R Recommendation BT.2100-2, "Image parameter values for high dynamic range television for use in production and international programme exchange," Jul. 2018, 16 pages.

ITU-R Recommendation BT.709-6, "Parameter values for the HDTV standards for production and international programme exchange," Jun. 2015, pp. 1-17.

"High Dynamic Range Electro-Optical Transfer Function of Mastering Reference Displays" SMPTE Standard, SMPTE-2084:2014; 14 pp.

"Camera Aperture Image and Usage," SMPTE Standard for Motion-Picture Film (8-mm Type R), SMPTE-231-2004, Society of Motion Picture and Television Engineers, Nov. 8, 2004, 4 pp.

Sharp Corporation., "Performance Investigation of high dynamic range and wide color gamut video coding techniques," International Telecommunication Union, Study Group 16, No. COM 16-C 1030-E, Sep. 2015, pp. 1-27.

"Parameter values for ultra-high definition television systems for production and international programme exchange," Recommendation ITU-R BT.2020-2, International Telecommunication Union, Oct. 2015, 8 pp.

Bordes et al., "Description of SDR, HDR and 360 Video Coding Technology Proposal by Qualcomm and Technicolor-Medium Complexity Version," JVET-J0022r1, 10th Meeting; San Diego, US, Apr. 10-20, 2018 (The Joint Video Exploration Team of ISO/IEC JTC1/SC29/WG11 and ITU-T SG.16); 84 pp.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018 (The Joint Video Exploration Team of ISO/IEC JTC1/SC29/WG11 and ITU-T SG.16); URL: http://phenix.int-evry.fr/jvet/, pp. 1-43.

Rusanovskyy D., et al., "Additional information on HDR video coding technology proposal by Qualcomm and Technicolor", Joint Video Experts Team (JVET) of ITU-T SG 16 WP 3 and ISO/IEC JTC 1/SC 29/WG 11, 10th Meeting San Diego, US, Apr. 10-20, 2018, JVET-J0067r1, 10 pages.

* cited by examiner

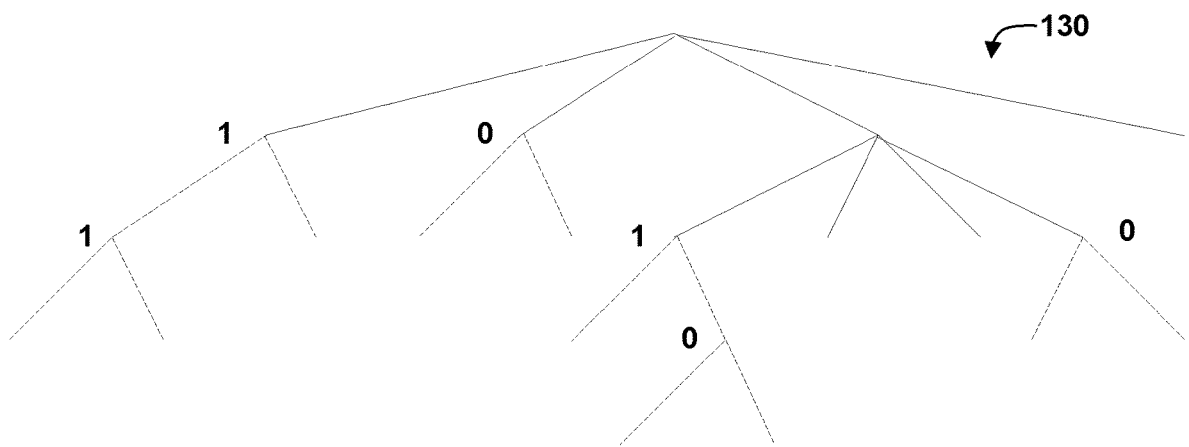
FIG. 2A
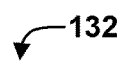
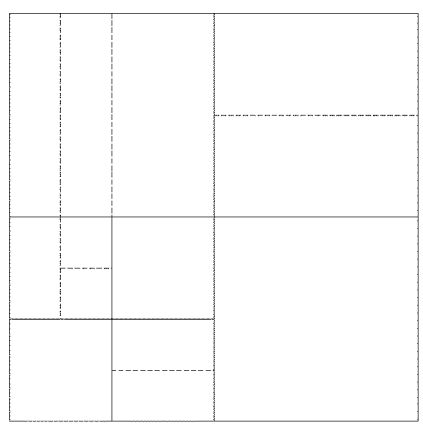
FIG. 2B

Example of EOTFs

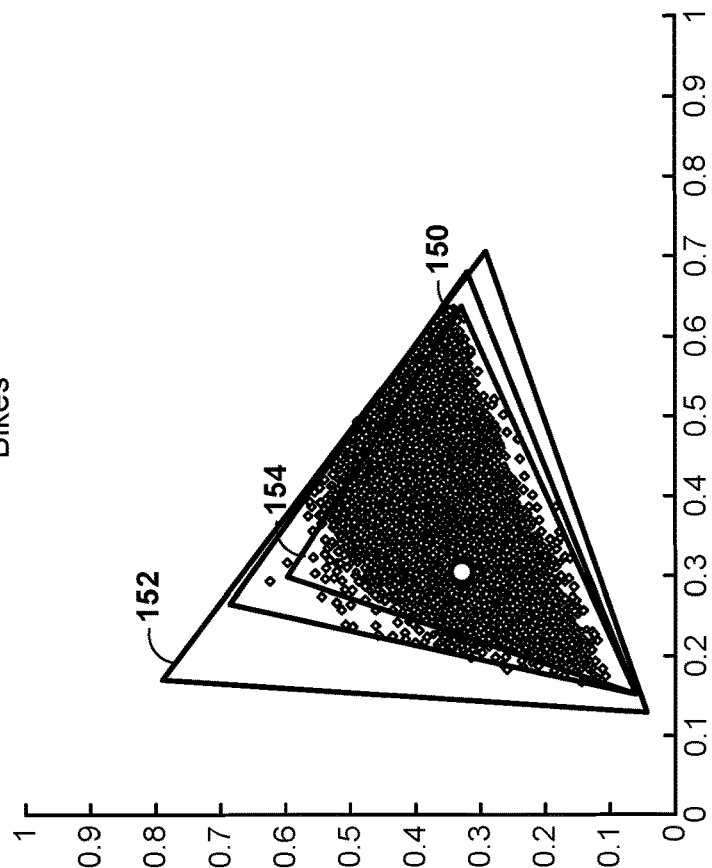
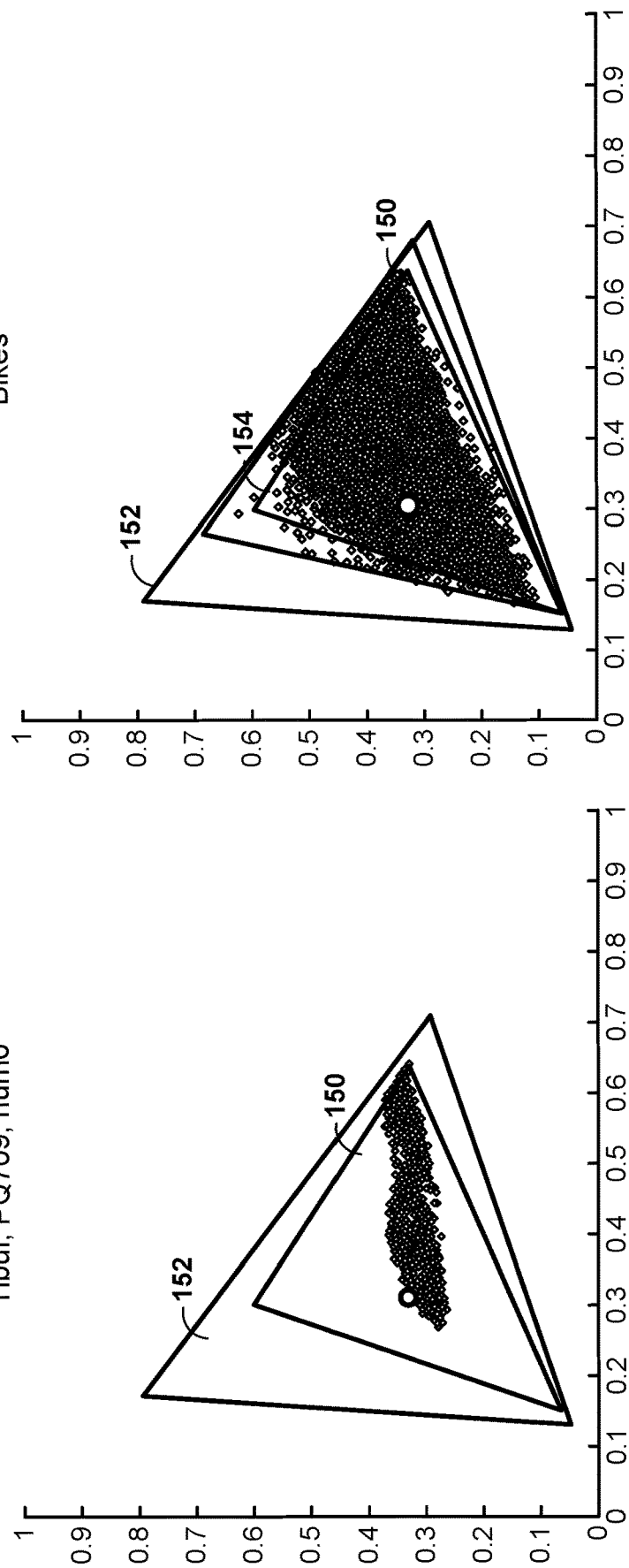
Visualization of color distribution in xy color plan
FIG. 9A - Tibul HDR sequence, captured in native BT.709 color gamut;
FIG. 9B - Bikes HDR sequences, captured in native P3 color gamut

SYSTEM AND METHOD OF CROSS-COMPONENT DYNAMIC RANGE ADJUSTMENT (CC-DRA) IN VIDEO CODING

This application claims the benefit of U.S. Provisional Application No. 62/548,236, filed Aug. 21, 2017, the entire content of which is incorporated by reference herein.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

The total number of color values that may be captured, coded, and displayed may be defined by a color gamut. A color gamut refers to the range of colors that a device can capture (e.g., a camera) or reproduce (e.g., a display). Often, color gamuts differ from device to device. For video coding, a predefined color gamut for video data may be used such that each device in the video coding process may be configured to process pixel values in the same color gamut. Some color gamuts are defined with a larger range of colors than color gamuts that have been traditionally used for video coding. Such color gamuts with a larger range of colors may be referred to as a wide color gamut (WCG).

Another aspect of video data is dynamic range. Dynamic range is typically defined as the ratio between the maximum and minimum brightness (e.g., luminance) of a video signal. The dynamic range of common video data used in the past is considered to have a standard dynamic range (SDR). Other example specifications for video data define color data that has a larger ratio between the maximum and minimum brightness. Such video data may be described as having a high dynamic range (HDR).

SUMMARY

This disclosure is directed to the field of coding of video signals with high dynamic range (HDR) and wide color gamut (WCG) representations. More specifically, in some examples, this disclosure describes signaling and operations applied to video data in certain color spaces to enable more efficient compression of HDR and WCG video data. For example, according to some examples, the compression efficiency of hybrid-based video coding systems utilized for coding HDR and WCG video data may be improved.

This disclosure describes example techniques and devices for performing cross-component dynamic range adjustment of chrominance components of video data. In one example, this disclosure describes deriving a scale parameter for the dynamic range adjustment of luma components of video data. In one example, one or more scale parameters for the dynamic range adjustment of chroma components may be derived as a function of the luma scale parameters. By using the luma scale factors to derive scale parameters for chroma components, the amount of visual distortion in decoded video data may be reduced. In other examples, scale factors for chroma components may be derived using a function of one or more of luma scale factors, chroma quantization parameter (QP) values, and/or color container parameters (e.g., transfer functions defined for color containers).

The techniques described herein may be used in conjunction with video codecs operating according to a video coding standard. Example video coding standards may include H.264/AVC (Advanced Video Coding), H.265/HEVC (High Efficiency Video Coding), H.266/VVC (Versatile Video coding), and other standards, that are configured to encode and decode HDR and/or WCG content.

In one example of the disclosure, a method of processing video data comprises receiving video data, determining luma scale parameters for each of a plurality of ranges of codeword values for luminance components of the video data, performing a dynamic range adjustment process on the luminance components using the luma scale parameters, determining chroma scale parameters for chrominance components of the video data using a function of the luma scale parameters, and performing a dynamic range adjustment process on the chrominance components of the video data using the chroma scale parameters.

In another example of the disclosure, an apparatus configured to process video data comprises a memory configured to store the video data, and one or more processors in communication with the memory, the one or more processors configured to receive the video data, determine luma scale parameters for each of a plurality of ranges of codeword values for luminance components of the video data, perform a dynamic range adjustment process on the luminance components using the luma scale parameters, determine chroma scale parameters for chrominance components of the video data using a function of the luma scale parameters, and perform a dynamic range adjustment process on the chrominance components of the video data using the chroma scale parameters.

In another example of the disclosure, an apparatus configured to process video data comprises means for receiving video data, means for determining luma scale parameters for each of a plurality of ranges of codeword values for luminance components of the video data, means for performing a dynamic range adjustment process on the luminance components using the luma scale parameters, means for determining chroma scale parameters for chrominance components of the video data using a function of the luma scale parameters, and means for performing a dynamic range adjustment process on the chrominance components of the video data using the chroma scale parameters.

In another example, this disclosure describes a non-transitory computer-readable storage medium storing instructions that, when executed, causes one or more processors of a device configured to process video data to receive the video data, determine luma scale parameters for each of a plurality of ranges of codeword values for luminance components of the video data, perform a dynamic range adjustment process on the luminance components using the luma scale parameters, determine chroma scale parameters for chrominance components of the video data using a function of the luma scale parameters, and perform a dynamic range adjustment process on the chrominance components of the video data using the chroma scale parameters.

The details of one or more examples are set forth in the accompanying drawings and the description below. Other features, objects, and advantages will be apparent from the description, drawings, and claims.

BRIEF DESCRIPTION OF DRAWINGS

FIGS. 2A and 2B are conceptual diagrams illustrating an example quadtree binary tree (QTBT) structure, and a corresponding coding tree unit (CTU).

FIGS. 9A and 9B are conceptual diagrams illustrating a visualization of color distribution in two example color gamuts.

DETAILED DESCRIPTION

This disclosure is related to the processing and/or coding of video data with high dynamic range (HDR) and wide color gamut (WCG) representations. In one example, the techniques of this disclosure include techniques for determining dynamic range adjustment parameters of chroma components of video data components as a function of dynamic range adjustment parameters for luma components. The techniques and devices described herein may improve compression efficiency and reduce distortion of hybrid-based video coding systems utilized for coding video data, including HDR and WCG video data.

Figure 1:
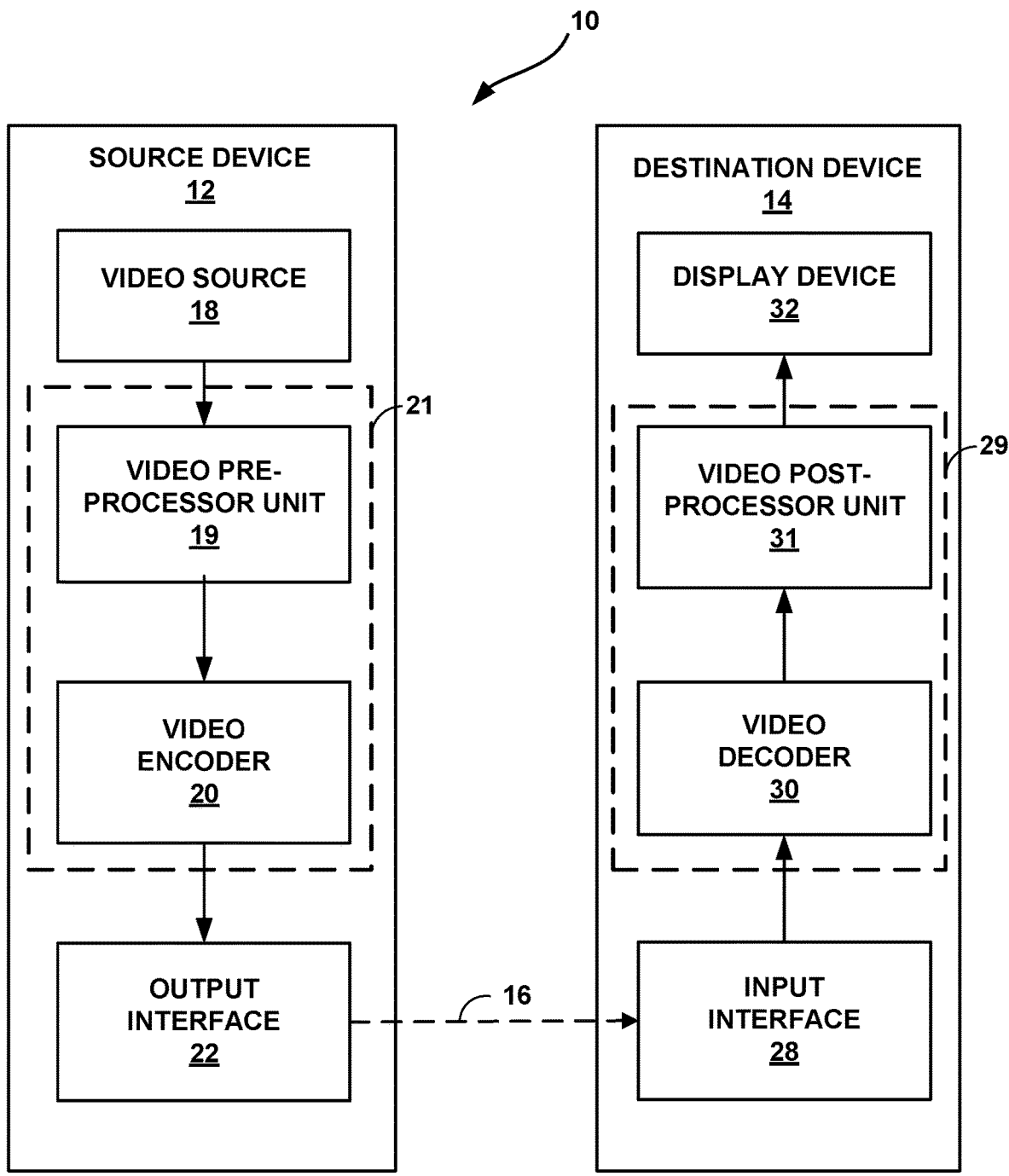
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, broadcast receiver device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wired or wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video pre-processor unit 19 and video encoder 20, and output interface 22. Destination device 14 includes input interface 28, video decoding unit 29, which includes video post-processor unit 31 and video decoder 30, and display device 32. In accordance with this disclosure, video pre-processor unit 19 and/or video encoder 20 of source device 12 and video post-processor unit 31 and/or video decoder 30 of destination device 14 may be configured to implement the techniques of this disclosure, including performing cross-component dynamic range adjustment on chroma components of video to enable more efficient compression, with less distortion, of HDR and WCG video data. In some examples, video pre-processor unit 19 may be separate from video encoder 20. In other examples, video pre-processor unit 19 may be part of video encoder 20. Likewise, in some examples, video post-processor unit 31 may be separate from video decoder 30. In other examples, video post-processor unit 31 may be part of video decoder 30. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing HDR and WCG video data may be performed by any digital video encoding and/or video decoding device. Moreover, the techniques of this disclosure may also be performed by a video pre-processor and/or video post-processor (e.g., video pre-processor unit 19 and video post-processor unit 31). In general, a video pre-processor may be any device configured to process video data before encoding (e.g., before HEVC encoding). In general, a video post-processor may be any device configured to process video data after decoding (e.g., after HEVC decoding). Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components, as well as a video pre-processor and a video post-processor (e.g., video pre-processor unit 19 and video post-processor unit 31, respectively). Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoding unit 21. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video pre-processor unit 19 receives the video data from video source 18. Video pre-processor unit 19 may be configured to process the video data to convert it into a form that is suitable for encoding with video encoder 20. For example, video pre-processor unit 19 may perform dynamic range compacting (e.g., using a non-linear transfer function), color conversion to a more compact or robust color space, dynamic range adjustment, and/or floating-to-integer representation conversion. Video encoder 20 may perform video encoding on the video data outputted by video pre-processor unit 19. Video decoder 30 may perform the inverse of video encoder 20 to decode video data, and video post-processor unit 31 may perform the inverse of the operation of video pre-processor unit 19 to convert the video data into a form suitable for display. For instance, video post-processor unit 31 may perform integer-to-floating conversion, color conversion from the compact or robust color space, inverse dynamic range adjustment, and/or the inverse of the dynamic range compacting to generate video data suitable for display.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video pre-processor unit 19 and video post-processor unit 31 each may be implemented as any of a variety of suitable encoder circuitry, such as one or more microprocessors, DSPs, ASICs, FPGAs, discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above video pre-processor unit 19 and video post-processor unit 31 be separate devices from video encoder 20 and video decoder 30, respectively. In other examples, video pre-processor unit 19 may integrate with video encoder 20 in a single device and video post-processor unit 31 may be integrated with video decoder 30 in a single device.

In some examples, video encoder 20 and video decoder 30 operate according to a video compression standard, such as ISO/IEC MPEG-4 Visual and ITU-T H.264 (also known as ISO/IEC MPEG-4 AVC), and/or ITU-T H.265, also referred to as High Efficiency Video Coding (HEVC) or extensions thereto. In other examples, video encoder 20 and video decoder 30 may operate according to other proprietary or industry standards, such as the Joint Exploration Test Model (JEM). The techniques of this disclosure, however, are not limited to any particular coding standard.

The HEVC standard was finalized by the Joint Collaboration Team on Video Coding (JCT-VC) of ITU-T Video Coding Experts Group (VCEG) and ISO/IEC Motion Picture Experts Group (MPEG). A HEVC working draft specification, and referred to as HEVC WD hereinafter, is available from http://phenix.int-evry.fr/jct/doc_end_user/documents/15_Geneva/wg11/JCTVC-O1003-v2.zip.

Recently, a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1).".

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

As another example, video encoder 20 and video decoder 30 may be configured to operate according to JEM/VVC. According to JEM/VVC, a video coder (such as video encoder 20) partitions a picture into a plurality of coding tree units (CTUs). Video encoder 20 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning according to JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

In some examples, JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with a HDR and a WCG. Parameters of the utilized dynamic range and color gamut are two independent attributes of video content, and their specifications for purposes of digital television and multimedia services are defined by several international standards. For example, ITU-R Rec. BT.709, "Parameter values for the HDTV standards for production and international programme exchange," defines parameters for HDTV (high definition television), such as standard dynamic range (SDR) and standard color gamut. ITU-R Rec. BT.2020, "Parameter values for ultra-high definition television systems for production and international programme exchange," specifies UHDTV (ultra-high definition television), such as HDR and WCG (e.g., WCG defining color primaries that extend beyond the standard color gamut). Rec. BT.2100, "Image parameter values for high dynamic range television for use in production and international programme exchange" defines transfer functions and representations for HDR television use, including primaries that support wide color gamut representations. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the maximum and minimum brightness (e.g., luminance) of the video signal. Dynamic range may also be measured in terms of 'f-stop,' where one f-stop corresponds to a doubling of a signal's dynamic range. In MPEG's definition, content that features brightness variation with more than 16 f-stops is referred as HDR content. In some terms, levels between 10 and 16 f-stops are considered as intermediate dynamic range, but may be considered HDR in other definitions. In some examples of this disclosure, HDR video content may be any video content that has a higher dynamic range than traditionally used video content with a standard dynamic range (e.g., video content as specified by ITU-R Rec. BT.709).

Figure 3:
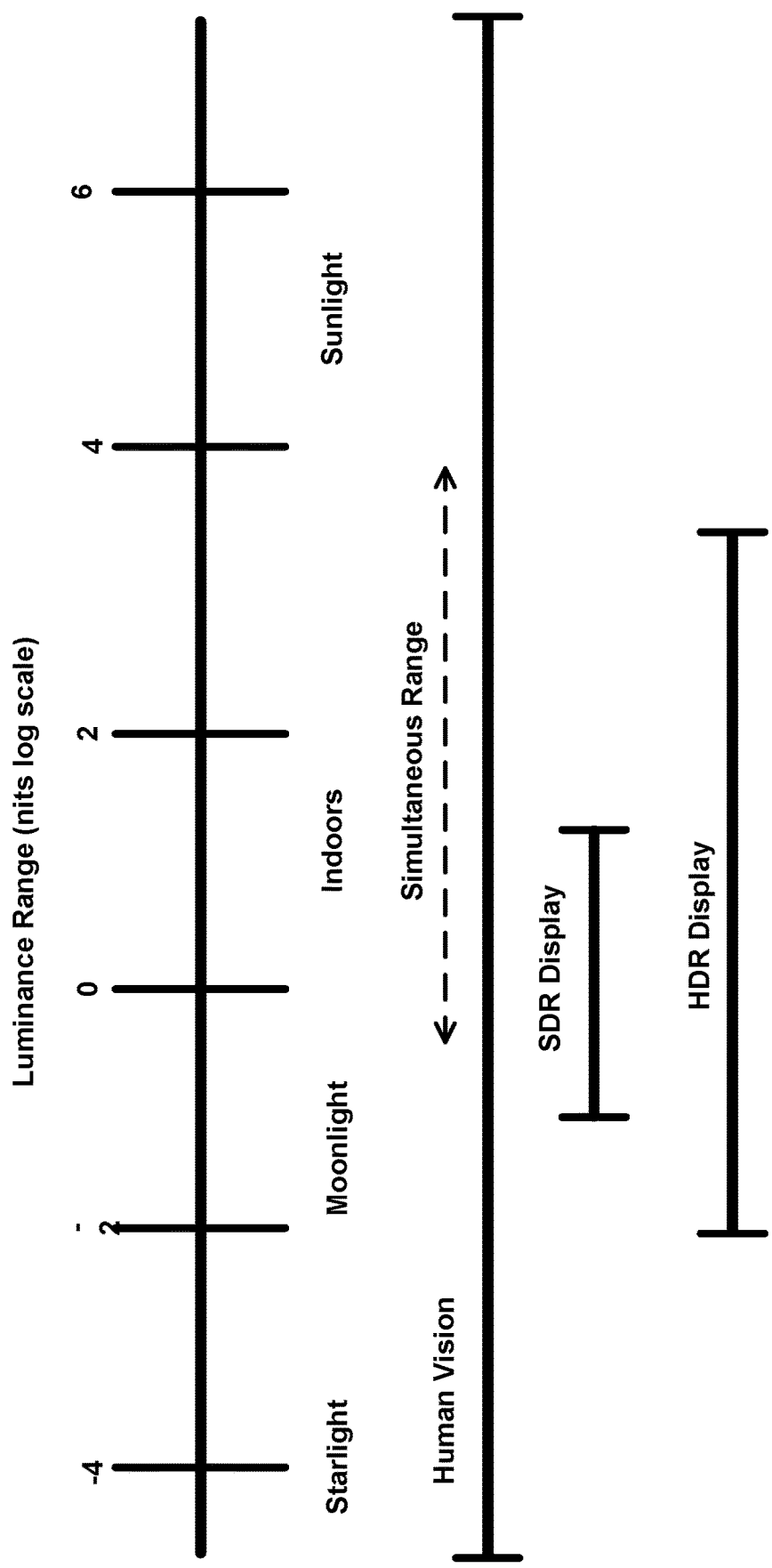
FIG. 3 is a conceptual drawing illustrating the concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). A visualization of the dynamic range provided by SDR of HDTV, expected HDR of UHDTV, and the dynamic range of the HVS is shown in FIG. 3, although the exact range may vary based on each individual and display.

Some example video applications and services are regulated by ITU Rec.709 and provide for an SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 4:
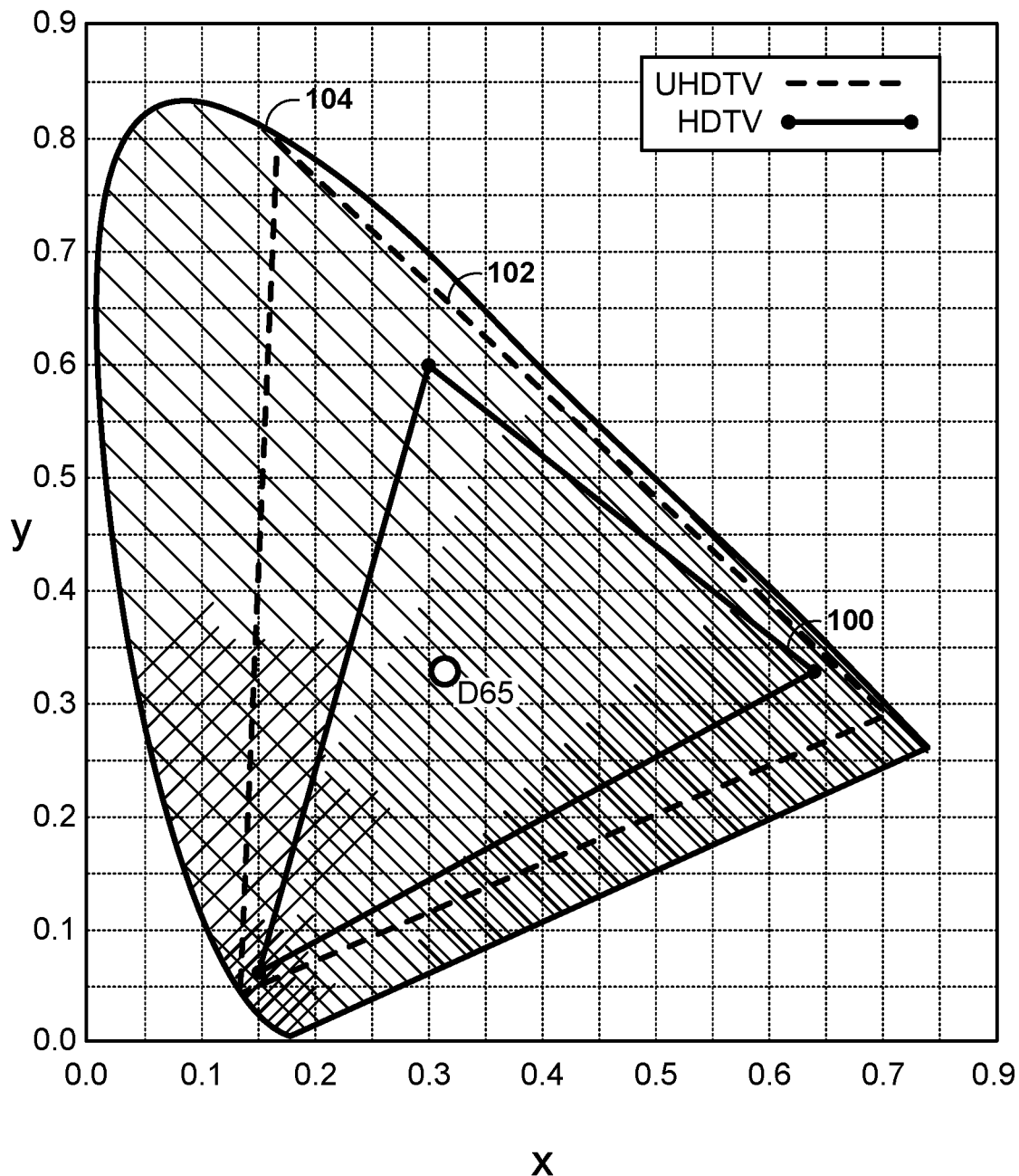
FIG. 4 is a conceptual diagram illustrating example color gamuts.

Another aspect for a more realistic video experience, besides HDR, is the color dimension. Color dimension is typically defined by the color gamut. FIG. 4 is a conceptual diagram showing an SDR color gamut (triangle 100 based on the BT.709 color primaries), and the wider color gamut that for UHDTV (triangle 102 based on the BT.2020 color primaries). FIG. 4 also depicts the so-called spectrum locus (delimited by the tongue-shaped area 104), representing the limits of the natural colors. As illustrated by FIG. 4, moving from BT.709 (triangle 100) to BT.2020 (triangle 102) color primaries aims to provide UHDTV services with about 70% more colors. D65 specifies an example white color for the BT.709 and/or BT.2020 specifications.

Examples of color gamut specifications for the DCI-P3, BT.709, and BT.2020 color spaces are shown in Table 1.

TABLE 1

| Color gamut parameters RGB color space parameters | | | | | | | | |
|---|---|---|---|---|---|---|---|---|
| Color | White point | | Primary colors | | | | | |
| space | $xx_W$ | $yy_W$ | $xx_R$ | $yy_R$ | $xx_G$ | $yy_G$ | $xx_B$ | $yy_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the x and y values of the primary colors (e.g., red (R), green (G), and blue (B). The x and y values represent normalized values that are derived from the chromaticity (X and Z) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

Figure 5:
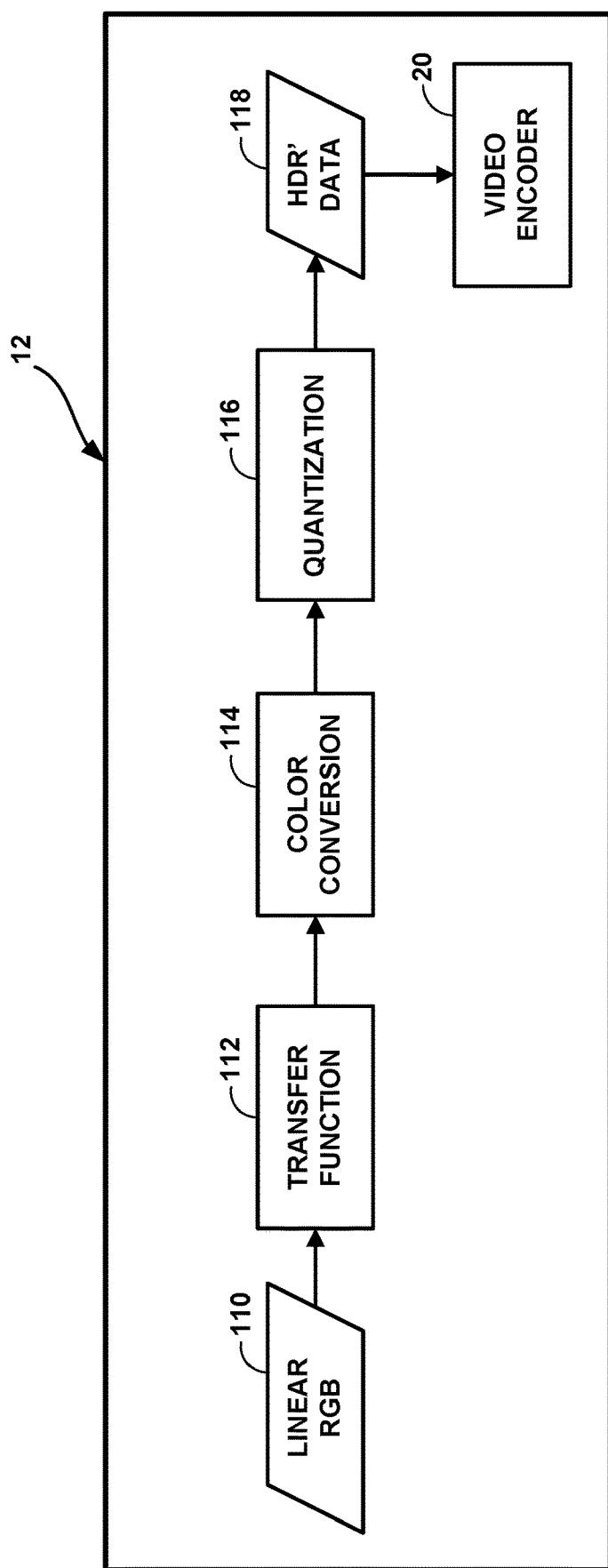
FIG. 5 is a flow diagram illustrating an example of HDR/WCG representation conversion.

One example of a video data format conversion process for purposes of compression includes three major processes, as shown in FIG. 5. The techniques of FIG. 5 may be performed by source device 12. Linear RGB data 110 may be HDR/WCG video data and may be stored in a floating point representation. Linear RGB data 110 may be compacted using a non-linear transfer function (TF) 112 for dynamic range compacting. Transfer function 112 may compact linear RGB data 110 using any number of non-linear transfer functions, e.g., the PQ TF as defined in SMPTE-2084. In some examples, color conversion process 114 converts the compacted data into a more compact or robust color space (e.g., a YUV or YCrCb color space) that is more suitable for compression by a hybrid video encoder. This data is then quantized using a floating-to-integer representation quantization unit 116 to produce converted HDR' data 118. In this example, HDR' data 118 is in an integer representation. The HDR' data is now in a format more suitable for compression by a hybrid video encoder (e.g., video encoder 20 applying H.264, HEVC, or VVC techniques). The order of the processes depicted in FIG. 5 is given as an example, and may vary in other applications. For example, color conversion may precede the TF process. In addition, additional processing, e.g. spatial subsampling, may be applied to color components.

Figure 6:
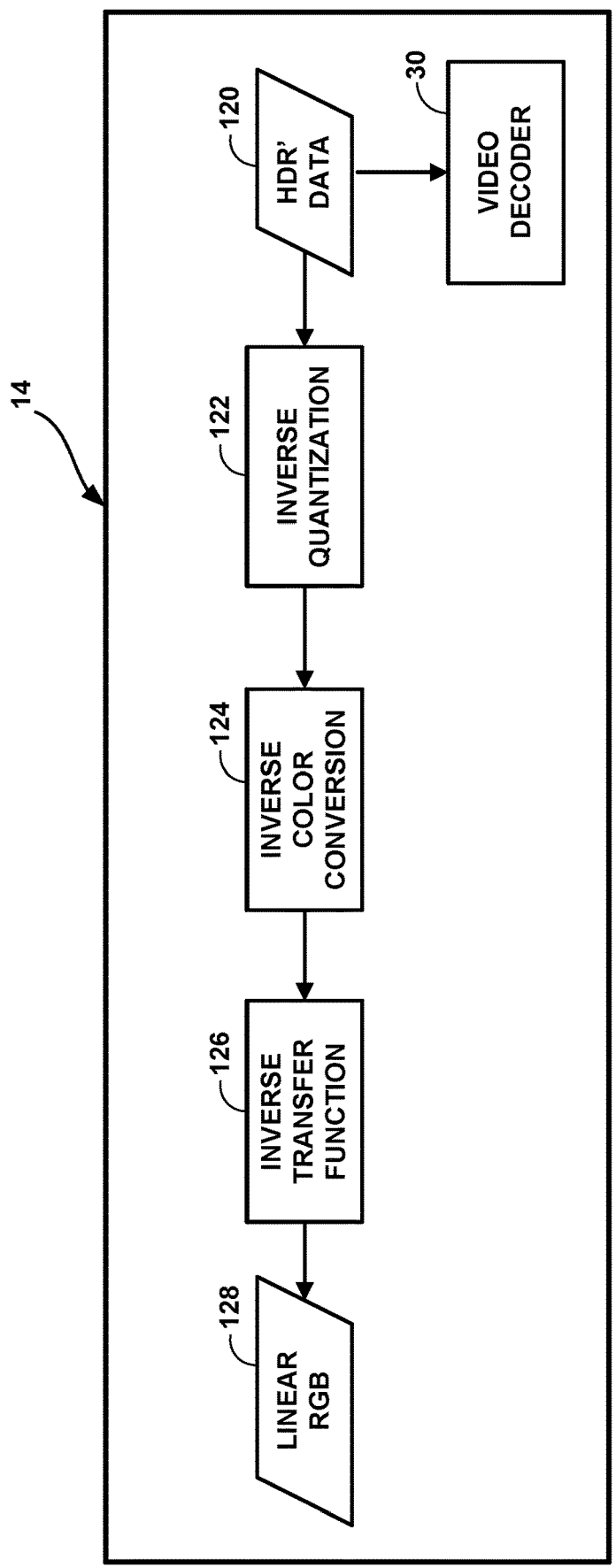
FIG. 6 is a flow diagram illustrating an example of HDR/WCG inverse conversion.

The inverse conversion at the decoder side is depicted in FIG. 6. The techniques of FIG. 6 may be performed by destination device 14. Converted HDR' data 120 may be obtained at destination device 14 through decoding video data using a hybrid video decoder (e.g., video decoder 30 applying H.264, HEVC or VVC techniques). HDR' data 120 may then be inverse quantized by inverse quantization unit 122. Then an inverse color conversion process 124 may be applied to the inverse quantized HDR' data. The inverse color conversion process 124 may be the inverse of color conversion process 114. For example, the inverse color conversion process 124 may convert the HDR' data from a YCrCb format back to an RGB format. Next, inverse transfer function 126 may be applied to the data to add back the dynamic range that was compacted by transfer function 112 to recreate the linear RGB data 128.

Figure 7:
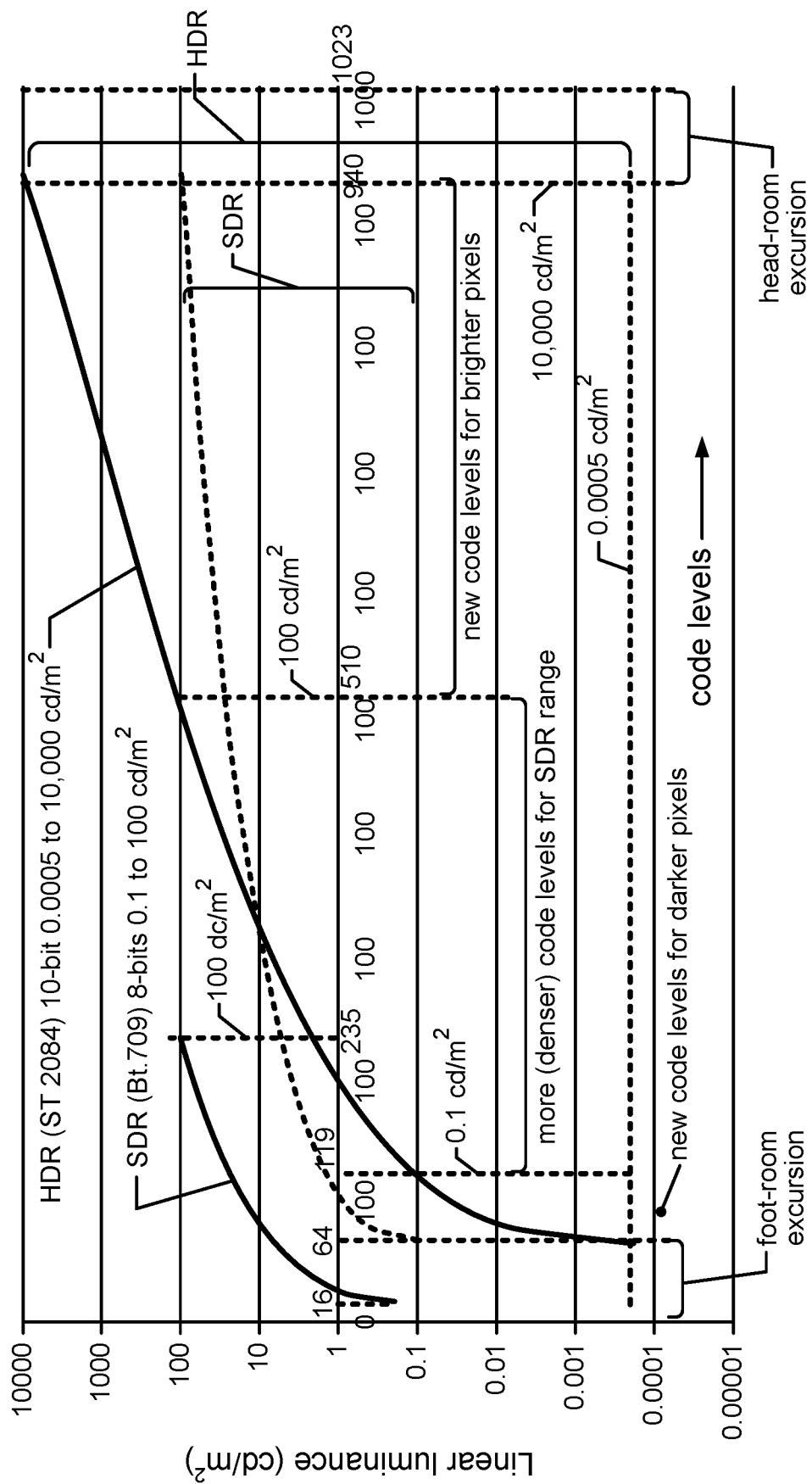
FIG. 7 is a conceptual diagram illustrating example of Electro-optical transfer functions (EOTF) utilized for video data conversion (including SDR and HDR) from perceptually uniform code levels to linear luminance.

The techniques depicted in FIG. 5 will now be discussed in more detail. In general, a transfer function is applied to data (e.g., HDR/WCG video data) to compact the dynamic range of the data such that errors due to quantization are perceptually uniform (approximately) across the range of luminance values. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in Rec. 709. In another example, the transfer function may approximate the HVS perception to brightness changes, e.g., the PQ transfer function specified in SMPTE-2084 for HDR. The inverse process of the OETF is the EOTF (electro-optical transfer function), which maps the code levels back to luminance. FIG. 7 shows several examples of non-linear transfer function used as EOTFs. The transfer functions may also be applied to each R, G and B component separately.

The specification of SMPTE-2084 defined the EOTF application as follows. The transfer function is applied to normalized linear R, G, B values which results in a nonlinear representation of R'G'B'. SMPTE-2084 defines normalization by NORM=10000, which is associated with a peak brightness of 10000 nits (cd/m2).

$$R' = PQ\_TF(\max(0, \min(R/NORM, 1)))$$

$$G' = PQ\_TF(\max(0, \min(G/NORM, 1)))$$

$$B' = PQ\_TF(\max(0, \min(B/NORM, 1)))$$

with $PQ\_TF(L) = ((c_1 + c_2 L^{m_1})/(1 + c_3 L^{m_1}))^{m_2}$ $m_1 = 2610/4096 \times \frac{1}{4} = 0.1593017578125$ $m_2 = 2523/4096 \times 128 = 78.84375$ $c_1 = c_3 - c_2 + 1 = 3424/4096 = 0.8359375$ $c_2 = 2413/4096 \times 32 = 18.8515625$ $c_3 = 2392/4096 \times 32 = 18.6875$ \hfill (1)

Figure 8:
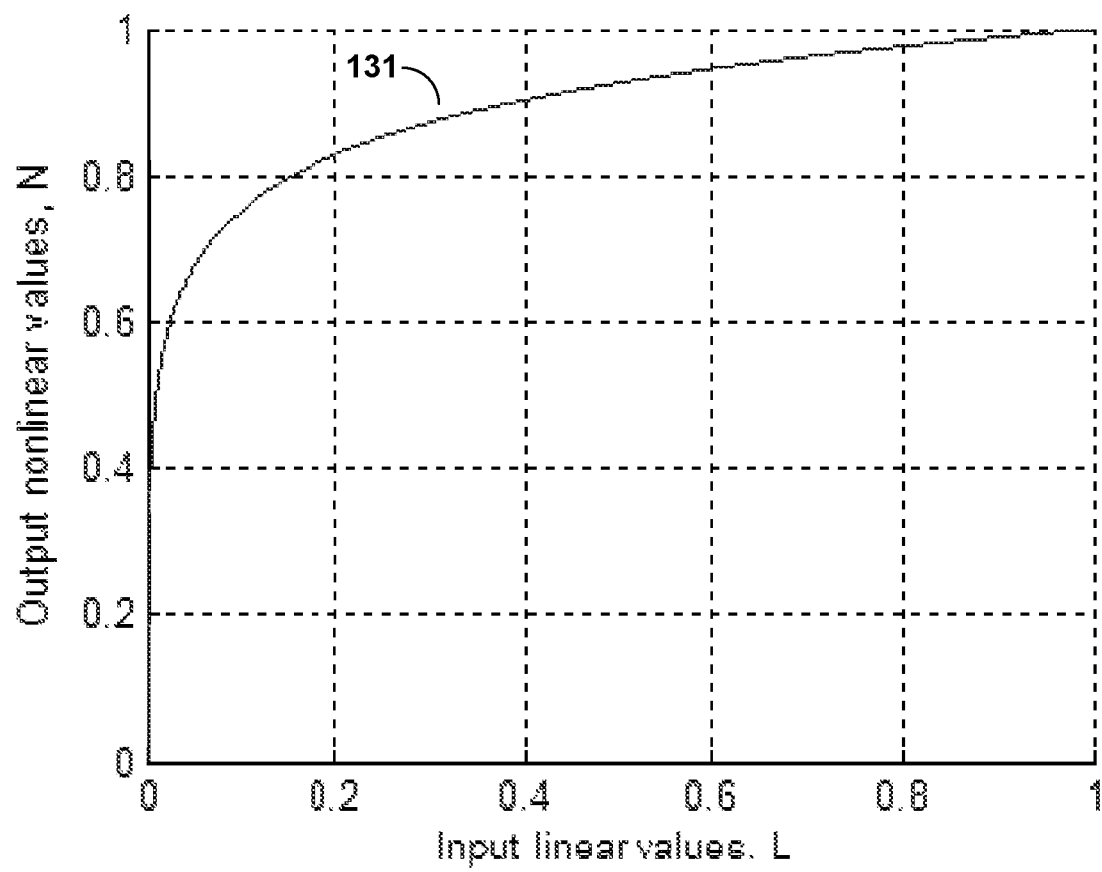
FIG. 8 is a conceptual diagram illustrating an example output curve for an EOTF.

With input values (linear color value) normalized to the range 0 . . . 1, the normalized output values (nonlinear color value) of PQ EOTF are visualized in FIG. 8. As it is seen from the curve 131, 1 percent (low illumination) of the dynamic range of the input signal is converted to 50% of the dynamic range of the output signal.

Typically, an EOTF is defined as a function with floating point accuracy, thus no error is introduced to a signal with this non-linearity if the inverse TF (so-called OETF) is applied. The inverse TF (OETF) specified in SMPTE-2084 is defined as an inversePQ function:

$$R = 10000 * \text{inversePQ\_TF}(R') \hfill (2)$$

$$G = 10000 * \text{inversePQ\_TF}(G')$$

$$B = 10000 * \text{inversePQ\_TF}(B')$$

with $\text{inversePQ\_TF}(N) = \left( \frac{\max[(N^{1/m_2} - c_1), 0]}{c_2 - c_3 N^{1/m_2}} \right)^{1/m_1}$ $m_1 = \frac{2610}{4096} \times \frac{1}{4} = 0.1593017578125$ $m_2 = \frac{2523}{4096} \times 128 = 78.84375$ $c_1 = c_3 - c_2 + 1 = \frac{3424}{4096} = 0.8359375$ $c_2 = \frac{2413}{4096} \times 32 = 18.8515625$ $c_3 = \frac{2392}{4096} \times 32 = 18.6875$ With floating point accuracy, the sequential application of an EOTF and OETF provides a perfect reconstruction without errors. However, this representation is not always optimal for streaming or broadcasting services. A more compact representation with fixed bits accuracy of nonlinear R'G'B' data is described in following sections.

Note, that EOTF and OETF are subjects of very active research currently, and the TF utilized in some HDR video coding systems may be different from SMPTE-2084.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

RGB data is typically utilized as the input color space, since RGB is the type of data that is typically produced by image-capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different less correlated components. In this context, a robust representation may refer to a color space featuring higher levels of error resilience when compressed at a constrained bitrate.

Modern video coding systems typically use the YCbCr color space, as specified in ITU-R BT.709 or ITU-R BT.709. The YCbCr color space in the BT.709 standard specifies the following conversion process from R'G'B' to Y'CbCr (non-constant luminance representation):

$$Y' = 0.2126 * R' + 0.7152 * G' + 0.0722 * B' \quad (3)$$
$$Cb = \frac{B' - Y'}{1.8556}$$
$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627 * R' + 0.6780 * G' + 0.0593 * B' \quad (5)$$
$$Cb = \frac{B' - Y'}{1.8814}$$
$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

It should be noted that both color spaces remain normalized. Therefore, for the input values normalized in the range 0 . . . 1, the resulting values will be mapped to the range 0 . . . 1. Generally, color transforms implemented with floating point accuracy provide perfect reconstruction; thus this process is lossless.

Following the color transform, input data in a target color space may be still represented at high bit-depth (e.g. floating point accuracy). That is, all processing stages described above are typically implemented in floating point accuracy representation; thus they may be considered as lossless. However, this type of accuracy can be considered as redundant and expensive for most of consumer electronics applications. For such applications, input data in a target color space is converted to a target bit-depth fixed point accuracy. The high bit-depth data may be converted to a target bit-depth, for example, using a quantization process.

Certain studies show that 10-12 bits accuracy in combination with the PQ transfer is sufficient to provide HDR data of 16 f-stops with distortion below the Just-Noticeable Difference (JND). In general, a JND is the amount of something (e.g., video data) that must be changed in order for a difference to be noticeable (e.g., by the HVS). Data represented with 10-bit accuracy can be further coded with most of the state-of-the-art video coding solutions. This conversion process includes signal quantization and is an element of lossy coding and is a source of inaccuracy introduced to converted data.

An example of such quantization applied to codewords in target color space. In this example, the YCbCr color space is shown below. Input values YCbCr represented in floating point accuracy are converted into a signal of fixed bit-depth BitDepthY for the Y value (luminance) and BitDepthC for the chroma values (Cb, Cr).

$$D_Y = \text{Clip1}_Y(\text{Round}((1<<(\text{BitDepth}_Y-8))*(219*Y'+16)))$$

$$D_{Cb} = \text{Clip1}_C(\text{Round}((1<<(\text{BitDepth}_C-8))*(224*Cb+128)))$$

$$D_{Cr} = \text{Clip1}_C(\text{Round}((1<<(\text{BitDepth}_C-8))*(224*Cr+128)))$$

with $$\text{Round}(x)=\text{Sign}(x)*\text{Floor}(\text{Abs}(x)+0.5)$$

$$\text{Sign}(x)=-1 \text{ if } x<0, 0 \text{ if } x=0, 1 \text{ if } x>0$$

Floor($x$) the largest integer less than or equal to $x$ $$\text{Abs}(x)=x \text{ if } x>=0, -x \text{ if } x<0$$

$$\text{Clip1}_Y(x)=\text{Clip3}(0,(1<<\text{BitDepth}_Y)-1,x)$$

$$\text{Clip1}_C(x)=\text{Clip3}(0,(1<<\text{BitDepth}_C)-1,x)$$

$$\text{Clip3}(x,y,z)=x \text{ if } z<x, y \text{ if } z>y, z \text{ otherwise} \quad (7)$$

It is anticipated that next generation HDR/WCG video applications will operate with video data captured at different parameters of HDR and CG. Examples of different configuration can be the capture of HDR video content with peak brightness up-to 1000 nits, or up-to 10,000 nits. Examples of different color gamuts may include BT.709, BT.2020 as well SMPTE specified-P3, or others.

It is also anticipated that a single color space, e.g., a target color container, that incorporates (or nearly incorporates) all other currently used color gamuts to be utilized in future. Example of such a target color container include BT.2020 and BT.2100. Support of a single target color container would significantly simplify standardization, implementation and deployment of HDR/WCG systems, since a reduced number of operational points (e.g., number of color containers, color spaces, color conversion algorithms, etc.) and/or a reduced number of required algorithms should be supported by a decoder (e.g., video decoder 30).

In one example of such a system, content captured with a native color gamut (e.g. P3 or BT.709) different from the target color container (e.g. BT.2020) may be converted to the target container prior to processing (e.g., prior to video encoding by video encoder 20).

During this conversion, the value range occupied by each component (e.g., RGB, YUV, YCrCb, etc.) of a signal captured in P3 or BT.709 color gamut may be reduced in a BT.2020 representation. Since the data is represented in floating point accuracy, there is no loss; however, when combined with color conversion and quantization, the shrinking of the value range leads to increased quantization error for input data.

In addition, in a real-world coding system, coding a signal with reduced dynamic range may lead to significant loss of accuracy for coded chroma components and would be observed by a viewer as coding artifacts, e.g., color mismatch and/or color bleeding.

Also, some of non-linearity (e.g., introduced by the transfer function of SMPTE-2084) and color representations (e.g. ITU-R BT.2020 or BT.22100) utilized in modern video coding systems may result in a video data representation that features significant variation of perceived distortion, or Just-Noticeable Difference (JND) threshold, over the dynamic range and color components of the signal representation. This can be called as perceived distortion. For such representations, a quantization scheme which applies a uniform scalar quantizer over the dynamic range of luma or chroma values may introduce quantization error with a different merit of perception depending on magnitude of the quantized samples. Such impact on signals may be interpreted as a processing system with a non-uniform quantization which results in unequal signal-to-noise ratios within processed data range.

An example of such a representation is a video signal represented in Non Constant Luminance (NCL) YCbCr color space whose color primaries are defined in ITU-R Rec. BT.2020, with SMPTE-2084 transfer function, or BT.2100. As illustrated in Table 1 above, this representation allocates a significantly larger amount of codewords for the low intensity values of the signal compared to the amount of codewords used on mid-range values (e.g., 30% of codewords represent linear light samples <10 nits with only 20% of codewords representing linear light between 10 and 100 nits). As a result, a video coding system (e.g., H.265/HEVC) featuring uniform quantization for all ranges of the data would introduce more severe coding artifacts to the mid-range and high intensity samples (moderate and bright region of the signal), while distortion introduced to low intensity samples (dark region of the same signal) may be far below a noticeable difference threshold in a typical viewing environment (with typical brightness level of the video).

Another example of such a representation is the effective dynamic range of the chroma components of ITU-R BT.2020/BT.2100 color representations. These containers support a much larger color gamut then conventional color containers (e.g., BT.709). However, under the constrains of finite bit depth utilized in a particular representation (e.g., 10 bits per sample), the finite bit depth would effectively reduce the granularity of conventional content (e.g., with BT.709 gamut) representation in the new format compared to the usage of a native container (e.g., BT.709).

This situation is visualized in FIGS. 9A and 9B, where colors of HDR sequences are depicted in an xy color plane. FIG. 9A shows colors of a "Tibul" test sequence captured in native BT.709 color space (triangle 150). However, the colors of the test sequence (shown as dots) do not occupy the full color gamut of BT.709 or BT.2020. In FIGS. 9A and 9B, triangle 152 represents a BT. 2020 color gamut. FIG. 9B shows colors of a "Bikes" HDR test sequence with a P3 native color gamut (triangle 154). As can be seen in FIG. 9B, the colors do not occupy the full range of the native color gamut (triangle 154) in the xy color plane; thus some color fidelity would be lost if content is represented in its container.

As a result, a video coding system (e.g. H.265/HEVC) featuring uniform quantization for all range and color components of the data would introduce much more visually perceived distortion to chroma components of a signal in a BT.2020 color container compared to a signal in a BT.709 color container.

Yet another example of a significant variation of perceived distortion, or Just-Noticeable Difference (JND) threshold, over the dynamic range or color components of some color representations are color spaces resulting from the application of a Dynamic Range Adjustment (DRA), or reshaper. DRA can be applied to video data partitioned to dynamic range partitions with a goal of providing a uniform perception of the distortion within a full dynamic range. However, applying DRA to a color component independently may in turn introduce a bitrate re-allocation from one color component to another (e.g., a larger bit budget being spent on the luma components may result in more severe distortion introduced to chroma components, and vice versa).

Other techniques to address the problem of non-uniform perceptual quality codeword distribution in state-of-the-art color representation, such as BT.2020 or BT.2100, have been proposed "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, September 2015, describes applying a Dynamic Range Adjustment (DRA) to achieve a codewords re-distribution in video data in SMPTE-2084/BT.2020 color container prior to applying a hybrid, transform-based video coding scheme (e.g., H.265/HEVC).

The redistribution achieved by applying a DRA targets the linearization of perceived distortion (e.g., signal to noise ratio) within a dynamic range. To compensate this redistribution at the decoder side, and convert data to the original ST 2084/BT.2020 representation, an inverse DRA process is applied to the data after video decoding.

In one example, the DRA may be implemented as a piece-wise linear function f(x), which is defined for a group of non-overlapped dynamic range partitions (ranges) $\{R_i\}$ of input value x, were i is an index of the range. The term i= 0 . . . N−1, where N is the total number of ranges $\{R_i\}$ utilized for defining the DRA function. Assume that the ranges of the DRA are defined by a minimum and a maximum x value that belongs to the range $R_i$, e.g. $[x_i, x_{i+1}-1]$, where $x_i$ and $x_{i+1}$ denote minimum value of the ranges $R_i$ and $R_{i+1}$, respectively. When applied to the Y (luma) color component of the video data, the DRA function Sy is defined through a scale $S_{y,i}$ and offset $O_{y,i}$ value, which are applied to every $x \in [x_i, x_{i+1}-1]$, thus $S_y = \{S_{y,i}, O_{y,i}\}$.

With this, for any Ri, and every $x \in [x_i, x_{i+1}-1]$, the output value X is calculated as follows:

$$X = S_{y,i} * (x - O_{y,i}) \tag{7}$$

For the inverse DRA mapping process for luma component Y conducted at the decoder, the DRA function Sy is defined by inverse of scale $S_{y,i}$ and offset $O_{y,i}$ values, which are applied to every $X \in [X_i, X_{i+1}-1]$.

With this, for any Ri, and every $X \in [X_i, X_{i+1}-1]$, reconstructed value x is calculated as follows:

$$x = X/S_{y,i} + O_{y,i} \quad (8)$$

The forward DRA mapping process for chroma components Cb and Cr may be defined as following. This example is given with the u term denoting sample of Cb color component, which belongs to range Ri, $u \in [u_i, u_{i+1}-1]$, thus $S_u = \{S_{u,i}, O_{u,i}\}$:

$$U = S_{u,i} * (u - O_{y,i}) + \text{Offset} \quad (9)$$

where Offset equal to $2^{(bitdepth-1)}$ denotes the bi-polar Cb, Cr signal offset.

The inverse DRA mapping process conducted at the decoder for chroma components Cb and Cr may be defined as following. Example is given with the U term denoting sample of remapped Cb color component which belongs to the range Ri, $U \in [U_i, U_{i+1}-1]$:

$$u = (U - \text{Offset})/S_{u,i} + O_{y,i} \quad (10)$$

where Offset equal to $2^{(bitdepth-1)}$ denotes the bi-polar Cb, Cr signal offset.

"Performance investigation of high dynamic range and wide color gamut video coding techniques", J. Zhao, S.-H. Kim, A. Segall, K. Misra, VCEG document COM16-C 1030-E, September 2015, describes an intensity dependent spatially varying (block-based) quantization scheme to align bitrate allocation and visually perceived distortion between video coding applied on $Y_{2020}$ (ST2084/BT2020) and $Y_{709}$ (BT1886/BT 2020) representations. It was observed that to maintain the same level of quantization for luma components, the quantization of signal in $Y_{2020}$ and $Y_{709}$ may differ by a value that depends on luma, such that:

$$QP\_Y_{2020} = QP\_Y_{709} - f(Y_{2020}) \quad (11)$$

The function $f(Y_{2020})$ was found to be linear for intensity values (brightness level) of video in $Y_{2020}$, and it may be approximated as:

$$f(Y_{2020}) = \max(0.03 * Y_{2020} - 3, 0) \quad (12)$$

The proposed spatially varying quantization scheme being introduced at the encoding stage was found to be able to improve visually perceived signal-to-quantization noise ratio for coded video signal in ST 2084/BT.2020 representations. The mechanism of delta QP application and QP derivation for chroma components enables deltaQP propagation from luma to chroma components, thus allowing for some degree of compensation for chroma components from bitrate increase introduced to the luma component.

"Luma-driven chroma scaling (LCS) design, HDR CE2: Report on CE2.a-1 LCS," JCTVC-W0101, A. K. Ramasubramonian, J. Sole, D. Rusanovskyy, D. Bugdayci, M. Karczewicz, describes a method to adjust chroma information (e.g., Cb and Cr components), by exploiting brightness information associated with processed chroma sample. Similarly to the DRA approach above, it was proposed to apply a scale factor $S_u$ to a Cb chroma sample and apply a scale factor $S_{v,i}$ to a Cr chroma sample. However, instead of defining a DRA function as piece-wise linear function $S_u = \{S_{u,i}, O_{u,i}\}$ for a set of ranges $\{R_i\}$ accessible by chroma value u or v as in Equations (9) and (10), an example LCS approach utilizes the luma value Y to derive a scale factor for the chroma sample. With this, forward LCS mapping of the chroma sample u (or v) is conducted as:

$$U = S_{u,i}(Y) * (u - \text{Offset}) + \text{Offset} \quad (13)$$

The inverse LCS process conducted at the decoder side is defined as follows:

$$u = (U - \text{Offset})/S_{u,i}(Y) + \text{Offset} \quad (14)$$

In more detail, for a given pixel located at (x, y), chroma samples Cb(x, y) or Cr(x, y) are scaled with a factor derived from their LCS function $S_{Cb}$ or $S_{Cr}$, which is accessed by their corresponding luma value Y'(x, y).

At the forward LCS for chroma samples, Cb (or Cr) values and the associated luma values Y' are taken as an input to the chroma scale function $S_{Cb}$ (or $S_{Cr}$) and are converted into Cb' and Cr', as shown in Equation 15. At the decoder side, the inverse LCS is applied. The reconstructed Cb' or Cr' are converted to Cb, or Cr as it shown in Equation (16)

$$Cb'(x, y) = S_{Cb}(Y'(x, y)) * Cb(x, y), \quad (15)$$
$$Cr'(x, y) = S_{Cr}(Y'(x, y)) * Cr(x, y)$$

$$Cb(x, y) = \frac{Cb'(x, y)}{S_{Cb}(Y'(x, y))} \quad (16)$$

$$Cr(x, y) = \frac{Cr'(x, y)}{S_{Cr}(Y'(x, y))}$$

Figure 10:
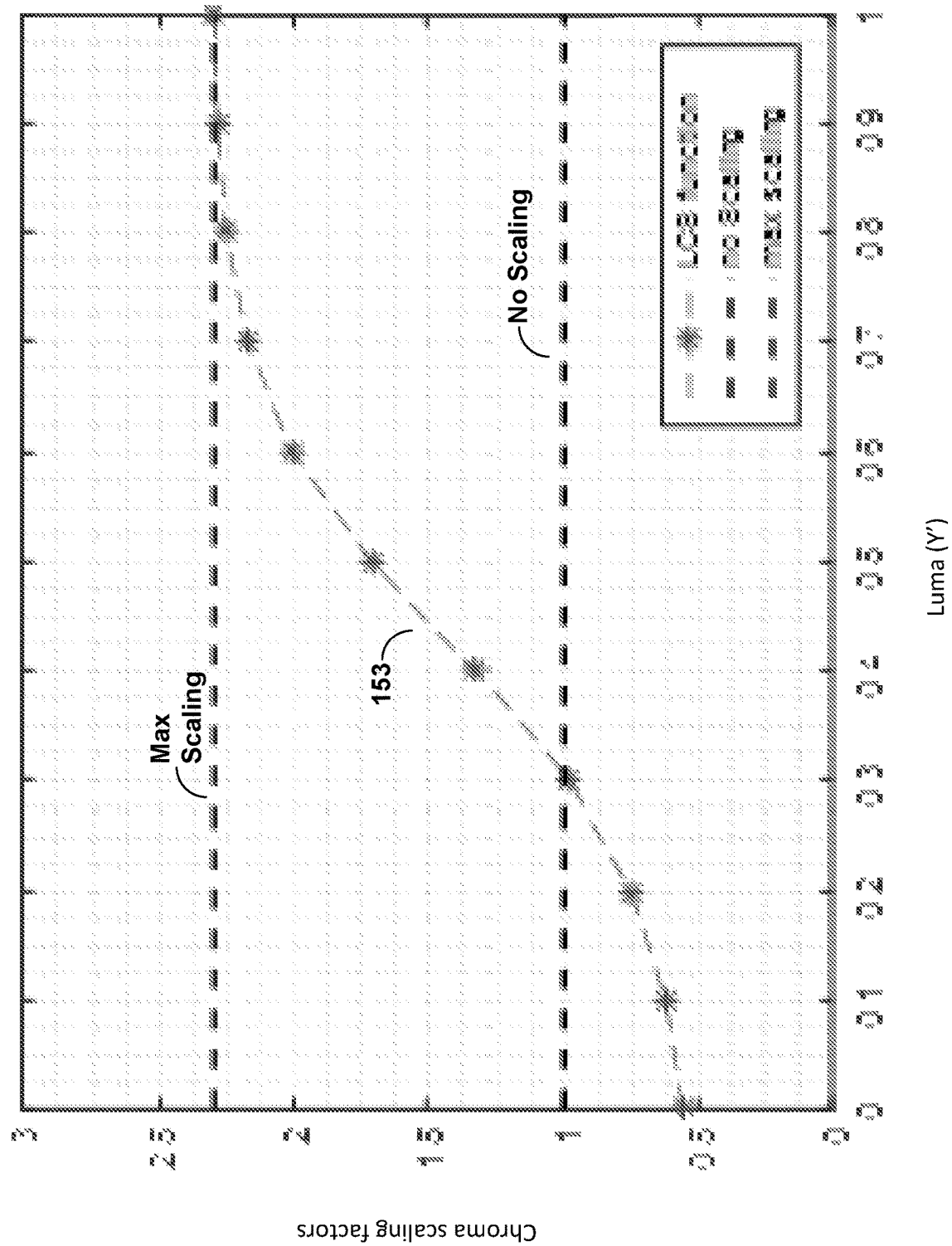
FIG. 10 a is a plot of a luma-driven chroma scaling (LCS) function.

FIG. 10 shows an example of an LCS function, where the chroma scaling factor is function of the associated luma value. In the example of FIG. 10, using the LCS function 153, chroma components of pixels with smaller values of luma are multiplied with smaller scaling factors.

This disclosure describes techniques, methods, and apparatuses to perform a dynamic range adjustment (DRA), including cross-component DRA to compensate dynamic range changes introduced to HDR signal representations by a color gamut conversion. The dynamic range adjustment may help to prevent and/or lessen any distortion caused by a color gamut conversion, including color mismatch, color bleeding, etc. In one or more examples of the disclosure, DRA is performed on the values of each color component of the target color space, e.g., YCbCr, prior to quantization at the encoder side (e.g., by video pre-processor unit 19 of source device 12) and after the inverse quantization at the decoder side (e.g., by video post-processor unit 31 of destination device 14). In other examples, the DRA techniques of this disclosure may be performed within video encoder 20 and video decoder 30.

Figure 11:
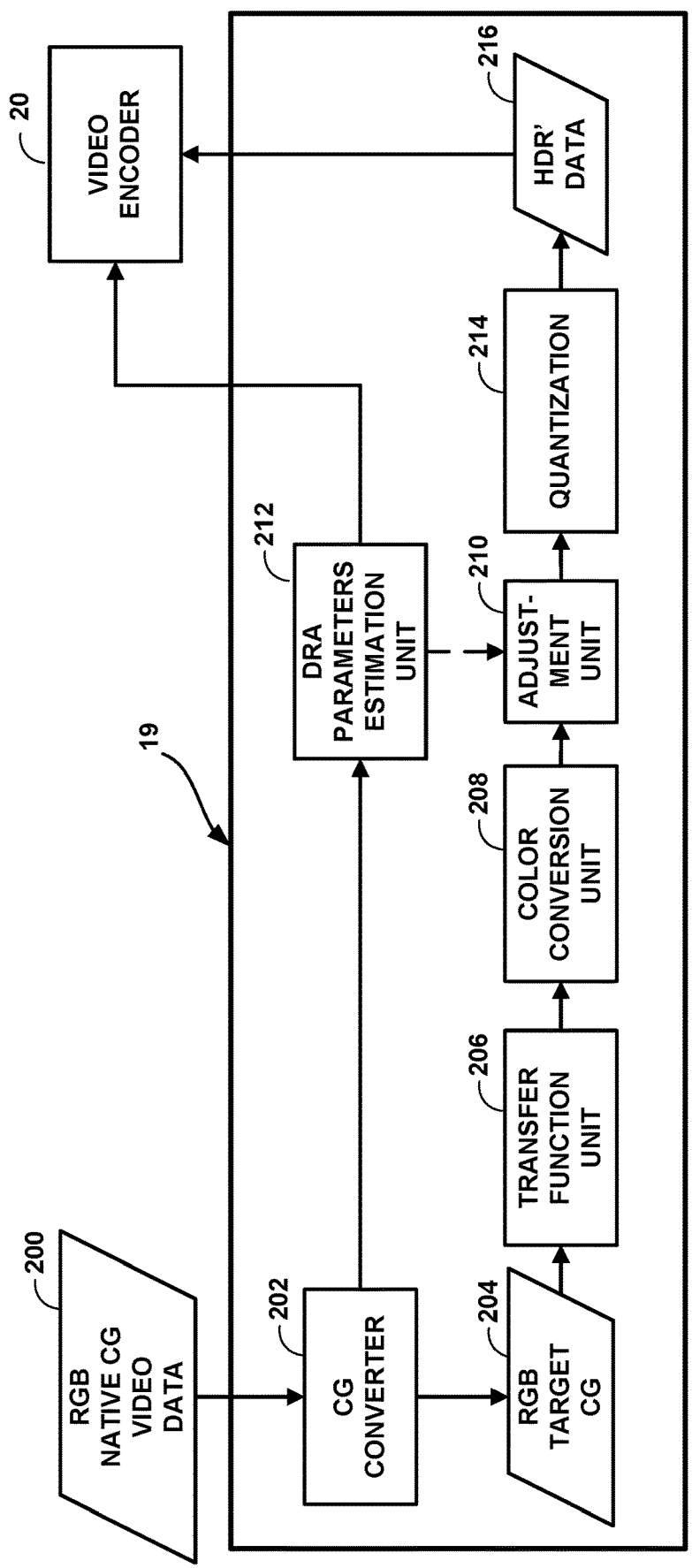
FIG. 11 is a block diagram illustrating an example HDR/WCG conversion apparatus operating according to the techniques of this disclosure.

FIG. 11 is a block diagram illustrating an example HDR/WCG conversion apparatus operating according to the techniques of this disclosure. In FIG. 11, solid lines specify the data flow and dashed lines specify control signals. The techniques of this disclosure may be performed by video pre-processor unit 19 of source device 12 or by video encoder 20. As discussed above, video pre-processor unit 19 may be a separate device from video encoder 20. In other examples, video pre-processor unit 19 may be incorporated into the same device as video encoder 20.

As shown in FIG. 11, RGB native CG video data 200 is input to video pre-processor unit 19. In the context of video preprocessing by video pre-processor unit 19, RGB native CG video data 200 is defined by an input color container. The input color container specifies set of color primaries used to represent video data 200 (e.g., BT.709, BT.2020, BT.2100 P3, etc.). In one example of the disclosure, video pre-processor unit 19 may be configured to convert both the color container and the color space of RGB native CB video data 200 to a target color container and target color space for HDR' data 216. Like the input color container, the target color container may specify a set or color primaries used to represent the HDR' data 216. In one example of the disclosure, RGB native CB video data 200 may be HDR/WCG video, and may have a BT.2020 or P3 color container (or any WCG), and be in an RGB color space. In another example, RGB native CB video data 200 may be SDR video, and may have a BT.709 color container. In one example, the target color container for HDR' data 216 may have been configured for HDR/WCG video (e.g., BT.2020 color container) and may use a color space more optimal for video encoding (e.g., YCrCb).

In one example of the disclosure, CG converter 202 may be configured to convert the color container of RGB native CG video data 200 from the input color container (e.g., first color container) to the target color container (e.g., second color container). As one example, CG converter 202 may convert RGB native CG video data 200 from a BT.709 color representation to a BT.2020 color representation, example of which is shown below.

The process to convert RGB BT.709 samples ($R_{709}$, $G_{709}$, $B_{709}$) to RGB BT.2020 samples ($R_{2020}$, $G_{2020}$, $B_{2020}$) can be implemented with a two-step conversion that involves converting first to the XYZ representation, followed by a conversion from XYZ to RGB BT.2020 using the appropriate conversion matrices.

$$X = 0.412391*R_{709} + 0.357584*G_{709} + 0.180481*B_{709}$$

$$Y = 0.212639*R_{709} + 0.715169*G_{709} + 0.072192*B_{709}$$

$$Z = 0.019331*R_{709} + 0.119195*G_{709} + 0.950532*B_{709} \quad (17)$$

Conversion from XYZ to $R_{2020}G_{2020}B_{2020}$ (BT.2020):

$$R_{2020} = clipRGB(1.716651*X - 0.355671*Y - 0.253366*Z)$$

$$G_{2020} = clipRGB(-0.666684*X + 1.616481*Y + 0.015768*Z)$$

$$B_{2020} = clipRGB(0.017640*X - 0.042771*Y + 0.942103*Z) \quad (18)$$

Similarly, the single step and recommended method is as follows:

$$R_{2020} = clipRGB(0.627404078626*R_{709} + 0.329282097415*G_{709} + 0.043313797587*B_{709})$$

$$G2020 = clipRGB(0.069097233123*R709 + 0.919541035593*G709 + 0.011361189924*B709)$$

$$B_{2020} = clipRGB(0.016391587664*R_{709} + 0.088013255546*G_{709} + 0.895595009604*B_{709}) \quad (7)$$

The resulting video data after CG conversion is shown as RGB target CG video data 204 in FIG. 11. In other examples of the disclosure, the color container for the input data and the output HDR' data may be the same. In such an example, CG converter 202 need not perform any conversion on RGB native CG video data 200.

Next, transfer function unit 206 compacts the dynamic range of RGB target CG video data 204. Transfer function unit 206 may be configured to apply a transfer function to compact the dynamic range in the same manner as discussed above with reference to FIG. 5. The color conversion unit 208 converts RGB target CG color data 204 from the color space of the input color container (e.g., RGB) to the color space of the target color container (e.g., YCrCb). As explained above with reference to FIG. 5, color conversion unit 208 converts the compacted data into a more compact or robust color space (e.g., a YUV or YCrCb color space) that is more suitable for compression by a hybrid video encoder (e.g., video encoder 20).

Adjustment unit 210 is configured to perform a dynamic range adjustment (DRA) of the color converted video data in accordance with DRA parameters derived by DRA parameters estimation unit 212. In general, after CG conversion by CG converter 202 and dynamic range compaction by transfer function unit 206, the actual color values of the resulting video data may not use all available codewords (e.g., unique bit sequences that represent each color) allocated for the color gamut of a particular target color container. That is, in some circumstances, the conversion of RGB native CG video data 200 from an input color container to an output color container may overly compact the color values (e.g., Cr and Cb) of the video data such that the resultant compacted video data does not make efficient use of all possible color representations. As explained above, coding a signal with a reduced range of values for the colors may lead to a significant loss of accuracy for coded chroma components and would be observed by a viewer as coding artifacts, e.g., color mismatch and/or color bleeding.

Adjustment unit 210 may be configured to apply DRA parameters to the color components (e.g., YCrCb) of the video data, e.g., RGB target CG video data 204 after dynamic range compaction and color conversion to make full use of the codewords available for a particular target color container. Adjustment unit 210 may apply the DRA parameter to the video data at a pixel level (e.g., to each color component of a pixel). In general, the DRA parameters define a function that expands the codewords used to represent the actual video data to as many of the codewords available for the target color container as possible.

In one example of the disclosure, the DRA parameters include a scale and offset value that is applied to the color components of the video data (e.g., luma (Y) and chroma (Cr,Cb) color components). The offset parameter may be used to center the values of the color components to the center of the available codewords for a target color container. For example, if a target color container includes 1024 codewords per color component, an offset value may be chosen such that the center codeword is moved to codeword 512 (e.g., the middle most codeword). In other examples, the offset parameter may be used to provide better mapping of input codewords to output codewords such that overall representation in the target color container is more efficient in combating coding artifacts.

In one example, adjustment unit 210 applies DRA parameters to video data in the target color space (e.g., YCrCb) as follows:

$$Y'' = scale1 * Y' + offset1$$

$$Cb'' = scale2 * Cb' + offset2$$

$$Cr'' = scale3 * Cr' + offset3 \quad (19)$$

where signal components Y', Cb' and Cr' is a signal produced from RGB to YCbCr conversion (example in equation 3). Note that Y', Cr' and Cr' may also be a video signal decoded by video decoder 30. Y'', Cb'', and Cr'' are the color components of the video signal after the DRA parameters have been applied to each color component.

As can be seen in the example above, each color component is related to different scale and offset parameters. For example, scale1 and offset1 are used for the Y' component, scale2 and offset2 are used for the Cb' component, and scale3 and offset3 are used for the Cr' component. It should be understood that this is just an example. In other examples, the same scale and offset values may be used for every color component. As will be explained in more detail below, DRA parameters derivation unit 312 may be configured to determined scale values of the chroma components (e.g., Cr, Cb) as a function of the scale values determined for the luma components.

In other examples, each color component may be associated with multiple scale and offset parameters. For example, the actual distribution of chroma values for the Cr or Cb color components may differ for different partitions or ranges of codewords. As one example, there may be more unique codewords used above the center codeword (e.g., codeword 512) than there are below the center codeword. In such an example, adjustment unit 210 may be configured to apply one set of scale and offset parameters for chroma values above the center codeword (e.g., having values greater than the center codeword) and apply a different set of scale and offset parameters for chroma values below the center codeword (e.g., having values less than the center codeword).

As can be seen in the above example, adjustment unit 210 applies the scale and offset DRA parameters as a linear function. As such, it is not necessary for adjustment unit 210 to apply the DRA parameters in the target color space after color conversion by color conversion unit 208. This is because color conversion is itself a linear process. As such, in other examples, adjustment unit 210 may apply the DRA parameters to the video data in the native color space (e.g., RGB) before any color conversion process. In this example, color conversion unit 208 would apply color conversion after adjustment unit 210 applies the DRA parameters.

In another example of the disclosure, adjustment unit 210 may apply the DRA parameters in either the target color space or the native color space as follows:

$Y''=(scale1*(Y'-offsetY)+offset1)+offsetY;$ $Cb''=scale2*Cb'+offset2$ $Cr''=scale3*Cr'+offset3$ (20)

In this example, the parameter scale1, scale2, scale3, offset1, offset2, and offset3 have the same meaning as described above. The parameter offsetY is a parameter reflecting brightness of the signal, and can be equal to the mean value of Y'. In other examples, an offset parameter similar to offsetY may be applied for the Cb' and Cr' components to better preserve the mapping of the center value in the input and the output representations.

In another example of the disclosure, adjustment unit 210 may be configured to apply the DRA parameters in a color space other than the native color space or the target color space. In general, adjustment unit 210 may be configured to apply the DRA parameters as follows:

$A'=scale1*A+offset1;$ $B'=scale2*B+offset2$ $C'=scale3*C+offset3$ (21)

where signal components A, B and C are signal components in a color space which is different from target color space, e.g., RGB or an intermediate color space.

In other examples of the disclosure, adjustment unit 210 is configured to apply a linear transfer function to the video to perform DRA. Such a transfer function is different from the transfer function used by transfer function unit 206 to compact the dynamic range. Similar to the scale and offset terms defined above, the transfer function applied by adjustment unit 210 may be used to expand and center the color values to the available codewords in a target color container. An example of applying a transfer function to perform DRA is shown below:

$Y''=TF2(Y')$ $Cb''=TF2(Cb')$ $Cr''=TF2(Cr')$

Term TF2 specifies the transfer function applied by adjustment unit 210. In some examples, adjustment unit 210 may be configured to apply different transfer functions to each of the components.

In another example of the disclosure, adjustment unit 210 may be configured to apply the DRA parameters jointly with the color conversion of color conversion unit 208 in a single process. That is, the linear functions of adjustment unit 210 and color conversion unit 208 may be combined. An example of a combined application, where f1 and f2 are a combination of the RGB to YCbCr matrix and the DRA scaling factors, is shown below:

$$Cb = \frac{B'-Y'}{f1}; Cr = \frac{R'-Y'}{f2}$$

In another example of the disclosure, after applying the DRA parameters, adjustment unit 210 may be configured to perform a clipping process to prevent the video data from having values outside the range of codewords specified for a certain target color container. In some circumstances, the scale and offset parameters applied by adjustment unit 210 may cause some color component values to exceed the range of allowable codewords. In this case, adjustment unit 210 may be configured to clip the values of the components that exceed the range to the maximum value in the range.

The DRA parameters applied by adjustment unit 210 may be determined by DRA parameters estimation unit 212. The frequency and the time instances at which the DRA parameters estimation unit 212 updates the DRA parameters are flexible. For example, DRA parameters estimation unit 212 may update the DRA parameters on a temporal level. That is, new DRA parameters may be determined for a group of pictures (GOP), or a single picture (frame). In this example, the RGB native CG video data 200 may be a GOP or a single picture. In other examples, DRA parameters estimation unit 212 may update the DRA parameters on a spatial level, e.g., at the slice tile, or block level. In this context, a block of video data may be a macroblock, coding tree unit (CTU), coding unit, or any other size and shape of block. A block may be square, rectangular, or any other shape. Accordingly, the DRA parameters may be used for more efficient temporal and spatial prediction and coding.

In one example of the disclosure, DRA parameters estimation unit 212 may derive the DRA parameters based on the correspondence of the native color gamut of RGB native CG video data 200 and the color gamut of the target color container. For example, DRA parameters estimation unit 212 may use a set of predefined rules to determine scale and offset values given a certain native color gamut (e.g., BT.709) and the color gamut of a target color container (e.g., BT.2020).

In some examples, DRA parameters estimation unit 212 may be configured to estimate the DRA parameters by determining the primaries coordinates in primeN from the actual distribution of color values in RGB native CG video data 200, and not from the pre-defined primary values of the native color gamut. That is, DRA parameters estimation unit 212 may be configured to analyze the actual colors present in RGB native CG video data 200, and use the primary color values and white point determined from such an analysis in the function described above to calculate DRA parameters. Approximation of some parameters defined above might be used as DRA to facilitate the computation.

In other examples of the disclosure, DRA parameters estimation unit 212 may be configured to determine the DRA parameters based not only on the color gamut of the target color container, but also on the target color space. The actual distributions of values of component values may differ from color space to color space. For example, the chroma value distributions may be different for YCbCr color spaces having a constant luminance as compared to YCbCr color spaces having a non-constant luminance. DRA parameters estimation unit 212 may use the color distributions of different color spaces to determine the DRA parameters.

In other examples of the disclosure, DRA parameters estimation unit 212 may be configured to derive values for DRA parameters so as to minimize certain cost functions associated with pre-processing and/or encoding video data. As one example, DRA parameters estimation unit 212 may be configured to estimate DRA parameters that minimized quantization errors introduced by quantization unit 214. DRA parameters estimation unit 212 may minimize such an error by performing quantization error tests on video data that has had different sets of DRA parameters applied. In another example, DRA parameters estimation unit 212 may be configured to estimate DRA parameters that minimize the quantization errors introduced by quantization unit 214 in a perceptual manner. DRA parameters estimation unit 212 may minimize such an error based on perceptual error tests on video data that has had different sets of DRA parameters applied. DRA parameters estimation unit 212 may then select the DRA parameters that produced the lowest quantization error.

In another example, DRA parameters estimation unit 212 may select DRA parameters that minimize a cost function associated with both the DRA performed by adjustment unit 210 and the video encoding performed by video encoder 20. For example, DRA parameters estimation unit 212 may perform DRA and encode the video data with multiple different sets of DRA parameters. DRA parameters estimation unit 212 may then calculate a cost function for each set of DRA parameters by forming a weighted sum of the bitrate resulting from DRA and video encoding, as well as the distortion introduced by these two lossy process. DRA parameters estimation unit 212 may then select the set of DRA parameters that minimizes the cost function.

In each of the above techniques for DRA parameter estimation, DRA parameters estimation unit 212 may determine the DRA parameters separately for each component using information regarding that component. In other examples, DRA parameters estimation unit 212 may determine the DRA parameters using cross-component information. For example, as will be discussed in more detail below, the DRA parameters (e.g., scale) derived for a luma (Y) component may be used to derive DRA parameters (e.g., scale) for chroma components (Cr and/or Cb).

In addition to deriving DRA parameters, DRA parameters estimation unit 212 may be configured to signal the DRA parameters in an encoded bitstream. DRA parameters estimation unit 212 may signal one or more syntax elements that indicate the DRA parameters directly, or may be configured to provide the one or more syntax elements to video encoder 20 for signaling. Such syntax elements of the parameters may be signaled in the bitstream such that video decoder 30 and/or video post-processor unit 31 may perform the inverse of the process of video pre-processor unit 19 to reconstruct the video data in its native color container. Example techniques for signaling the DRA parameters are discussed below.

In one example, DRA parameters estimation unit 212 and/or video encoder 20 may signal one or more syntax elements in an encoded video bitstream as metadata, in a supplemental enhancement information (SEI) message, in video usability information (VUI), in a video parameter set (VPS), in a sequence parameter set (SPS), in a picture parameter set, in a slice header, in a CTU header, or in any other syntax structure suitable for indicating the DRA parameters for the size of the video data (e.g., GOP, pictures, blocks, macroblock, CTUs, etc.).

In some examples, the one or more syntax elements indicate the DRA parameters explicitly. For example, the one or more syntax elements may be the various scale and offset values for DRA. In other examples, the one or more syntax elements may be one or more indices into a lookup table that includes the scale and offset values for DRA. In still another example, the one or more syntax elements may be indices into a lookup table that specifies the linear transfer function to use for DRA.

In other examples, the DRA parameters are not signaled explicitly, but rather, both video pre-processor unit 19/video encoder 20 and video post-processor unit 31/video decoder 30 are configured to derive the DRA parameters using the same pre-defined process using the same information and/or characteristics of the video data that are discernible form the bitstream.

After adjustment unit 210 applies the DRA parameters, video pre-processor unit 19 may then quantize the video data using quantization unit 214. Quantization unit 214 may operate in the same manner as described above with reference to FIG. 5. After quantization, the video data is now adjusted in the target color space and target color gamut of the target primaries of HDR' data 216. HDR' data 216 may then be sent to video encoder 20 for compression.

Figure 12:
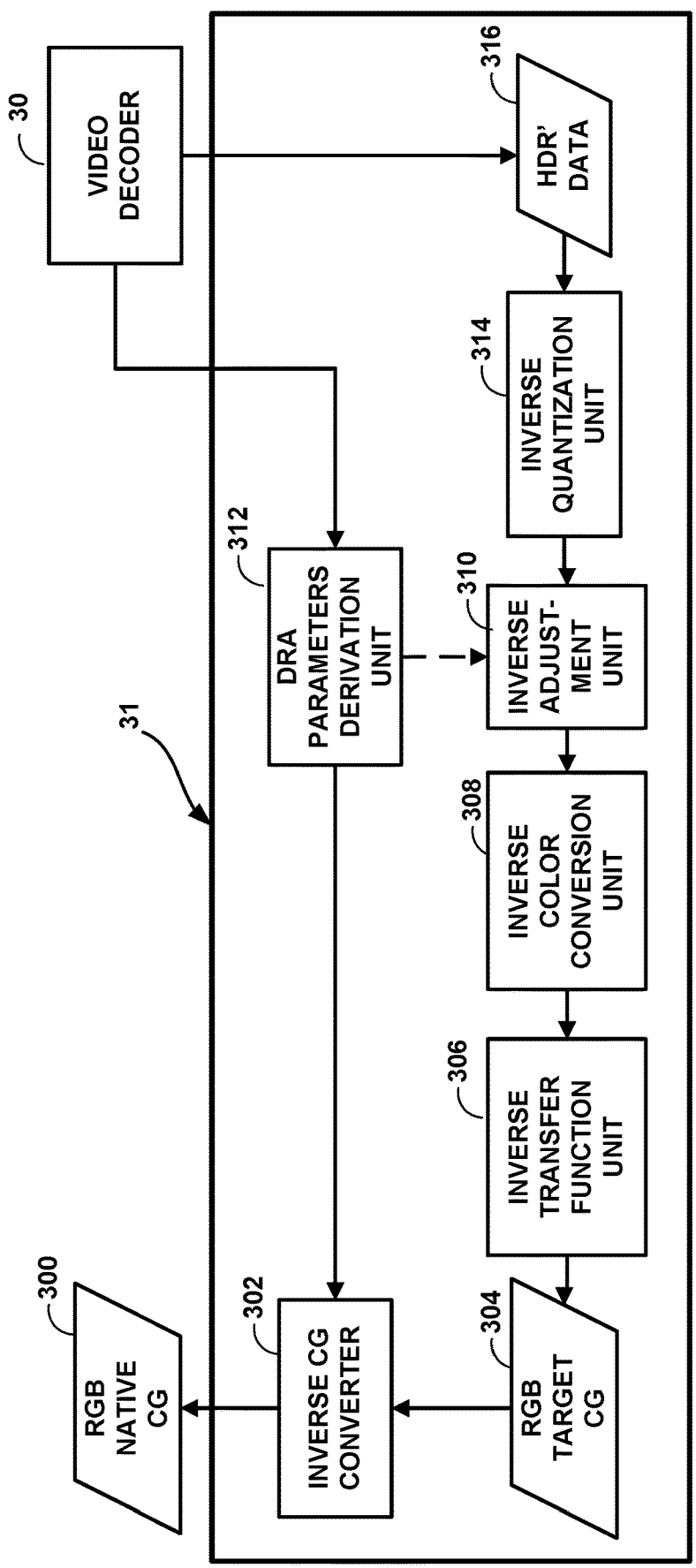
FIG. 12 is a block diagram illustrating an example HDR/WCG inverse conversion apparatus according to the techniques of this disclosure.

FIG. 12 is a block diagram illustrating an example HDR/WCG inverse conversion apparatus according to the techniques of this disclosure. As shown in FIG. 12, video post-processor unit 31 may be configured to apply the inverse of the techniques performed by video pre-processor unit 19 of FIG. 11. In other examples, the techniques of video post-processor unit 31 may be incorporated in, and performed by, video decoder 30.

In one example, video decoder 30 may be configured to decode the video data encoded by video encoder 20. The decoded video data (HDR' data 316 in the target color container) is then forwarded to video post-processor unit 31. Inverse quantization unit 314 performs an inverse quantization process on HDR' data 316 to reverse the quantization process performed by quantization unit 214 of FIG. 11.

Video decoder 30 may also be configured to decode and send any of the one or more syntax elements produced by DRA parameters estimation unit 212 of FIG. 11 to DRA parameters derivation unit 312 of video post-processor unit 31. DRA parameters derivation unit 312 may be configured to determine the DRA parameters based on the one or more syntax elements, as described above. In some examples, the one or more syntax elements indicate the DRA parameters explicitly. In other examples, DRA parameters derivation unit 312 is configured to derive the DRA parameters using the same techniques used by DRA parameters estimation unit 212 of FIG. 11.

The parameters derived by DRA parameters derivation unit 312 are sent to inverse adjustment unit 310. Inverse adjustment unit 310 uses the DRA parameters to perform the inverse of the linear DRA adjustment performed by adjustment unit 210. Inverse adjustment unit 310 may apply the inverse of any of the adjustment techniques described above for adjustment unit 210. In addition, as with adjustment unit 210, inverse adjustment unit 310 may apply the inverse DRA before or after any inverse color conversion. As such, inverse adjustment unit 310 may apply the DRA parameter on the video data in the target color container or the native color container. In some examples, inverse adjustment unit 310 may be positioned to apply inverse adjustment before inverse quantization unit 314.

Inverse color conversion unit 308 converts the video data from the target color space (e.g., YCbCr) to the native color space (e.g., RGB). Inverse transfer function 306 then applies an inverse of the transfer function applied by transfer function 206 to uncompact the dynamic range of the video data. In some examples, the resulting video data (RGB target CG 304) is still in the target color gamut, but is now in the native dynamic range and native color space. Next, inverse CG converter 302 converts RGB target CG 304 to the native color gamut to reconstruct RGB native CG 300.

In some examples, additional post-processing techniques may be employed by video post-processor unit 31. Applying the DRA may put the video outside its actual native color gamut. The quantization steps performed by quantization unit 214 and inverse quantization unit 314, as well as the up and down-sampling techniques performed by adjustment unit 210 and inverse adjustment unit 310, may contribute to the resultant color values in the native color container being outside the native color gamut. When the native color gamut is known (or the actual smallest content primaries, if signaled, as described above), then additional processing can be applied to RGB native CG video data 304 to transform color values (e.g., RGB or Cb and Cr) back into the intended gamut as post-processing for DRA. In other examples, such post-processing may be applied after the quantization or after DRA application.

In accordance with one or more examples below, this disclosure describes techniques and devices for cross-component Dynamic Range Adjustment (CC-DRA) for improving compression efficiency of image and video coding systems, such as H.264/AVC, H.265/HEVC or next generation of codecs (e.g., VVC). More specifically, this describes techniques and devices for deriving parameters of CC-DRA that is applied to chroma components (e.g., Cb and Cr), by exploiting parameters of the DRA function applied to the luma component and/or properties of the processed video signal (e.g., local brightness level, transfer characteristics, color container properties or native color gamut of the signal).

Assume that a DRA function $S_y = \{S_{y,i}, O_{y,i}\}$ is applied to Y component and the CC-DRA function that is applied to the chroma components (e.g., Cb, Cr) are specified by the LCS functions $S_{Cb}$ (or $S_{Cr}$). One or more of the following techniques may be applied independently, or in any suitable combination, to derive parameters of CC-DRA and its LCS functions $S_{Cb}$ (or $S_{Cr}$).

The following examples will be described with reference to video pre-processor unit 19. However, it should be understood that all of the processes performed by video pre-processor unit 19 may also be performed within the video encoder 20 as part of the video encoding loop. Video post-processor unit 31 may be configured to perform the same techniques as video pre-processor unit 19, but in a reciprocal manner. In particular, video post-processor unit 31 may be configured to determine parameters for CC-DRA of chroma components in the same manner as video pre-processor unit 19. All of the processes performed by video post-processor unit 31 may also be performed within the video decoder 30 as part of the video decoding loop.

As described above with reference to FIG. 11 and FIG. 12, video pre-processor unit 19 and video post-processor unit 31 may apply DRA to three components of video components of video data (e.g., YCbCr) to achieve a representation more efficient for compression with an image or video compression system (e.g., video encoder 20 and video decoder 30). Video pre-processor unit 19 may apply a DRA function $S_y$ to luma component (Y) and may apply CC-DRA to chroma components (e.g. Cb, Cr) with LCS functions $S_{Cb}$ (or $S_{Cr}$).

In one example of the disclosure, video pre-processor unit 19 may be configured to derive DRA parameters (e.g., scale and offset) for luma components of the video data in the manner described above with reference to FIG. 11. Video pre-processor unit 19 may also be configured to derive an offset parameter for chroma components in the manner described above with reference to FIG. 11. In accordance with one example of the disclosure, video pre-processor unit 19 may be configured to derive parameters (e.g., scale) of the LCS function $S_{Cb}$ or $S_{Cr}$ from parameters of the DRA function applied to the Y component, namely $S_{Cb}$ (or $S_{Cr}$) $=\text{fun}(S_y)$. That is, video pre-processor unit 19 may be configured to determine CC-DRA parameters (e.g., scale parameters) for a chroma component as a function of DRA parameters (e.g., scale parameters) derived for a luma component.

In some examples, video pre-processor unit 19 may be configured to set the scale factor of the LCS function for chroma values equal to the scale factor of the DRA function $S_y$, applied to the value of chroma components (Y):

$$S(Y)_{Cb} = S(Y)_{Cr} = S(Y)_y \qquad (22)$$

In this example, video pre-processor unit 19 may reuse the scale parameter derived for a luma value $(S(Y)_y)$ for use as the scale parameter for the corresponding Cr value $(S(Y)_{Cr})$ and for use as the scale parameter for the corresponding Cb value $(S(Y)_{Cb})$. In this context, the corresponding Cr and Cb values are the Cr and Cb values of the same pixel having the luma value.

In another example of the disclosure, video pre-processor unit 19 may be configured to determine luma scale parameters for each of a plurality of ranges of codeword values for luminance components of the video data. For example, the total range of codeword values for a luma components may be between 0 and 1023. Video pre-processor unit 19 may be configured to divide the possible codeword values for the luma component into a plurality of ranges, and then derive DRA parameters separately for each of the ranges. In some examples, lower scale values may be used for lower intensity luma values (e.g., dimmer values), while higher scale values may be used for higher intensity luma values (e.g., brighter values). The total number of luma codewords may be divided into any number of ranges, and the ranges may be uniform in size or may be non-uniform.

Accordingly, in some examples, the DRA function $S_y$ is defined for a set of ranges $\{R_i\}$. In this example, video pre-processor unit 19 may be configured to derive the scale factor of the LCS functions $S_{Cb}$ or $S_{Cr}$ from the values of the DRA scale factors $S_{y,i}$ of the range $R_i$ to which current Y belongs to:

$$S(Y)_{Cb} = S(Y)_{Cr} = \text{fun}(S(Y)_{y,i}), \text{ for any } Y \in R_i \quad (23)$$

where Y is a Luma value that belongs to the range $R_i=[Y_i, Y_{i+1}-1]$. In other words, the scale factor for a chroma component is a function of the scale factor for the corresponding luma component of the chroma component dependent upon the range the luma component falls within. As such, video pre-processor unit 19 may be configured to determine chroma scale parameters for chrominance components associated with luminance components having a first range of codeword values of the plurality of ranges of codeword values using a function of the luma scale parameter determined for the luminance components having the first range of codeword values.

However, chroma scale values may also be derived in ranges of chroma codeword values, and the ranges of codeword values for chroma components for which chroma scale parameters are derived may not directly overlap with the ranges of codeword values for luma components for which luma scale parameters are derived. For example, a single range of chroma codeword values may overlap with multiple ranges of luma codeword values. In this example, the derivation function $\text{fun}(S(Y)_{y,i})$ for deriving chroma component scales values can be implemented as zero-order approximation (e.g., an average of all scale values for range $R_i$ of luma scale values) or as an approximation of higher order (e.g., interpolation, curve fitting, low pass filtering, etc.).

In some examples, video pre-processor unit 19 may be configured to determine the chroma scale parameters for LCS functions $S_{Cb}$ or $S_{Cr}$ as a function of multiple luma DRA scale factors through a global curve fitting process:

$$S_{Cb} = S_{Cr} = \text{fun}(S_y) \quad (24)$$

Accordingly, video pre-processor unit 19 may be configured to determine chroma scale parameters for chrominance components associated with luminance components having a first range of codeword values and at least a second range of codeword values of the plurality of ranges of codeword values using a function of the luma scale parameter determined for the luminance components having the first range of codeword values and the second range of codeword values.

In some examples, the luma scale parameters are constant within a particular range of luma codeword values. As such, the luma scale parameters may be viewed as a discontinuous (e.g., step-wise) function over the entire range of luma codeword values. Rather than using the discontinuous luma scale parameters to derive the chroma scale parameters, video pre-processor unit 19 may be configured to apply a linearization process to the discontinuous function to produce linearized luma scale parameters. Video pre-processor unit 19 may be further configured to determine the chroma scale parameters for the chrominance components of the video data using a function of the linearized luma scale parameters. In some examples, the linearization process is one or more of a linear interpolation process, a curve fitting process, an averaging process, or a higher order approximation process.

Regardless of how the luma scale parameters and chroma scale parameters are derived, video pre-processor unit 19 may be configured to perform a dynamic range adjustment process on the luminance components using the luma scale parameters, and perform a dynamic range adjustment process on the chrominance components of the video data using the chroma scale parameters, in the manner described above with reference to FIG. 11.

In another example of the disclosure, video pre-processor unit 19 may be configured to derive parameters (e.g., scale parameters) of the LCS function $S_{Cb}$ or $S_{Cr}$ from parameters of the DRA function applied to the Y component $S_y$ and a quantization parameter (QP) of the codec (e.g., video encoder 20), such as quantization parameter (QP), deltaQP, chromaQP offset, or other parameters specifying granularity of the codec quantization. A deltaQP may indicate the difference between the QP for one block and the QP for another block. A chromaQP offset may be added to the QP of a luma component to determine the QP of a chroma component.

Accordingly, video pre-processor unit 19 may be configured to determine the chroma scale parameters for the chrominance components of the video data using a function of the luma scale parameters and a quantization parameter used to decode the chrominance components.

Below is an example:

$$S_{Cb} = \text{fun}(S_y, QP_{Cb})$$

$$S_{Cr} = \text{fun}(S_y, QP_{Cr}) \quad (25)$$

In some examples, the correspondence between the coding QP for a current component and an adjustment parameter for an $S_{Cb}$ or $S_{Cr}$ function can be tabulated and utilized for adjustment of the approximation function fun.

In some examples, a set of functions $\{\text{fun}(S_y, QP_{Cr})_{id}\}$ can be provided to video decoder 30 and/or video post-processor unit 31 as side information and a selection between these functions can be done by a derivation of function identification (id) from the bitstream, or from decoder-side analysis of the coding parameters, such as QP, coding modes, type of coded picture (I, B, P), availability of the prediction, or coding mode.

In another example of the disclosure, video pre-processor unit 19 may be configured to derive DRA parameters (e.g., scale parameters) of the LCS function $S_{Cb}$ or $S_{Cr}$ from parameters of the DRA function applied to the Y component $S_y$ and parameters of the colorimetry of processed video data and the utilized container (e.g., the color primaries of the native gamut and utilized color container). The parameters of the colorimetry of processed video data (color representation parameter) and the utilized container may be multiplication factors $\alpha$ and $\beta$ which may be the same for each of the chroma components (Cr and Cb) or may be independent for each of the chroma components.

$$S_{Cb} = \alpha * \text{fun}(S_y)$$

$$S_{Cr} = \beta * \text{fun}(S_y) \quad (26)$$

In some examples, the $\alpha$ and $\beta$ parameters can be defined by a single multiplicator parameter, e.g. $\alpha=1.0698$ and $\beta=2.1735$ for BT.709 video content represented in a BT.2020 color container.

In some examples, the $\alpha$ and $\beta$ parameters may be transmitted in an encoded bitstream. In other examples, the $\alpha$ and $\beta$ parameters may be derived by both video pre-processor unit 19/video encoder 20 and video post-processor unit 31/video decoder 30. Also, video pre-processor unit 19 may be configured to determine $\alpha$ and $\beta$ parameters over multiple ranges of chroma component codewords. That is, the $\alpha$ and $\beta$ parameters may be a single value for all of the chroma components or an array of values (e.g., for ranges of chroma component codewords).

In other examples, video pre-processor unit 19 may be configured to derive α and β parameter from colorimetry parameters (e.g., primary colors and white point coordinates of color container and native color gamut).

In other examples, video pre-processor unit 19 may be configured to determine the α and β parameter as a function of a luma value Y and/or chroma sample value.

In other examples, video pre-processor unit 19 may be configured to derive, and/or tabulate and access, the α and β parameters value using other color space characteristics, such as non-linearity (e.g., transform function) or utilized color space. Below is an example:

$$S_{Cb} = \alpha(\text{transfer\_characteristics}) * \text{fun}(S_y)$$

$$S_{Cr} = \beta(\text{transfer\_characteristics}) * \text{fun}(S_y) \quad (27)$$

Examples transfer characteristics may be transfer functions of BT.709, BT.2100, and/or (PQ)/BT.2100(HLG). Video pre-processor unit 19 may be configured to signal a transform_characteristics id syntax element whose value specifies the utilized non-linearity (e.g., transform function).

In some examples, the colorimetry parameters utilized for LCS derivation can be derived from transmitted bitstream, or can be derived from sample values of the video content at the decoder side. In some examples, the parameters α and β or a type of derivation function can be signaled through the bitstream or made available to the decoder as side information and identified with an id parameter signaled in the bitstream.

As described above, each of the above techniques may be used in any combination. For example, in one implementation, video pre-processor unit 19 may be configured to determine the chroma scale parameters for the chrominance components of the video data using a function of the luma scale parameters, the quantization parameter used to decode the chrominance components, and a color representation parameter derived from characteristics of the chroma component of the video data. In this example, video pre-processor unit 19 may also be configured to linearize the luma scale parameters.

In another example of the disclosure, video pre-processor unit 19 may be configured to derive parameters (e.g., scale parameters) of the LCS function $S_{Cb}$ or $S_{Cr}$ as a superposition of the DRA function applied to the Y component $S_y$ and DRA functions specified for current color components, as defined in Equations (3) and (4). The scale parameters derived from Equations (3) and (4) may be considered initial chroma scale parameters:

Below is an example:

$$S_{Cb} = \text{fun}(S_y(Y), S_u(u))$$

$$S_{Cr} = \text{fun}(S_y(Y) * S_v(v)) \quad (28)$$

As such, in one example of the disclosure, video pre-processor unit 19 may be configured to determine initial chroma scale parameters for the chrominance components of the video data, and determine the chroma scale parameters for the chrominance components of the video data using a function of the luma scale parameters and the initial chroma scale parameters.

Below are descriptions of several non-limiting examples of implementation of the techniques described above.

Assume a Y component is processed with DRA defined by a piece-wise linear function $S_{y,i}(Y)$ as a set of non-overlap ranges {Ri}, where Y is a processed luma sample and i is an Ri partitioning id. Subranges of the DRA function Ri are defined by minimum and maximum values belonging to the range, e.g., [yi, yi+1−1], where i denotes the index of the ranges consisting of DRA, yi term denotes starting value for the i range, and N being the total number of utilized subranges. A scale value $S_{y,i}$ and an offset value $O_{y,i}$ are defined for each Ri independently and applied to all Y samples with value that belong to the subrange [yi, yi+1−1].

Figure 13:
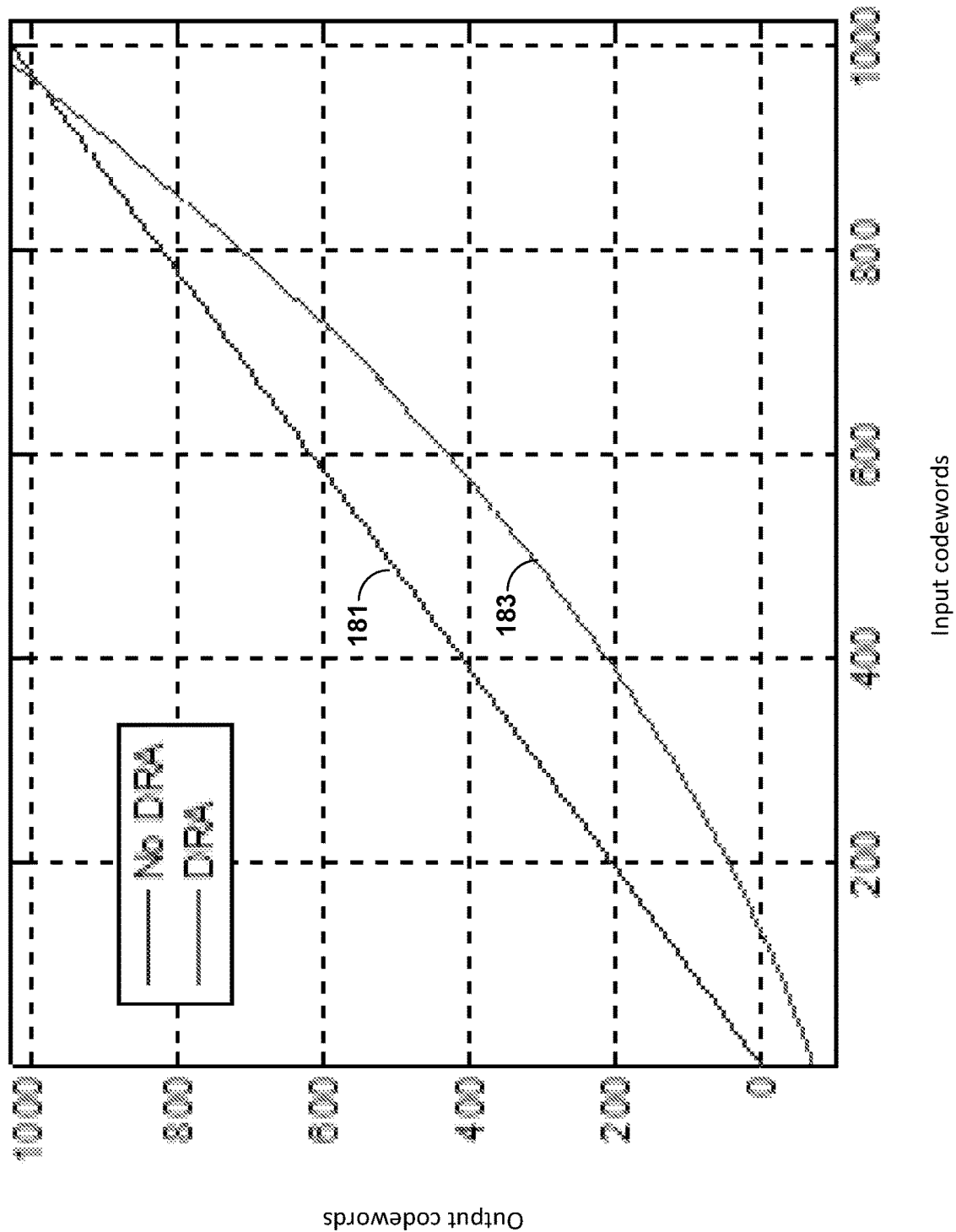
FIG. 13 shows an example of a dynamic range adjustment (DRA) mapping function.

In some examples, an inverse DRA function can be implemented at the decoder side, as shown in Equation (2) and FIG. 12 above. FIG. 13 shows an example of a DRA mapping function 183 applied to the input luma component Y (input codewords) and a "No DRA" function 181, when no DRA is conducted.

In some examples, the LCS function $S_{Cb}$ or $S_{Cr}$ for chroma scale factors can be defined by setting the LCS function value equal to the scale factor of the DRA function $S_y$ applied to the value Y, as shown in Equation (22).

Figure 14:
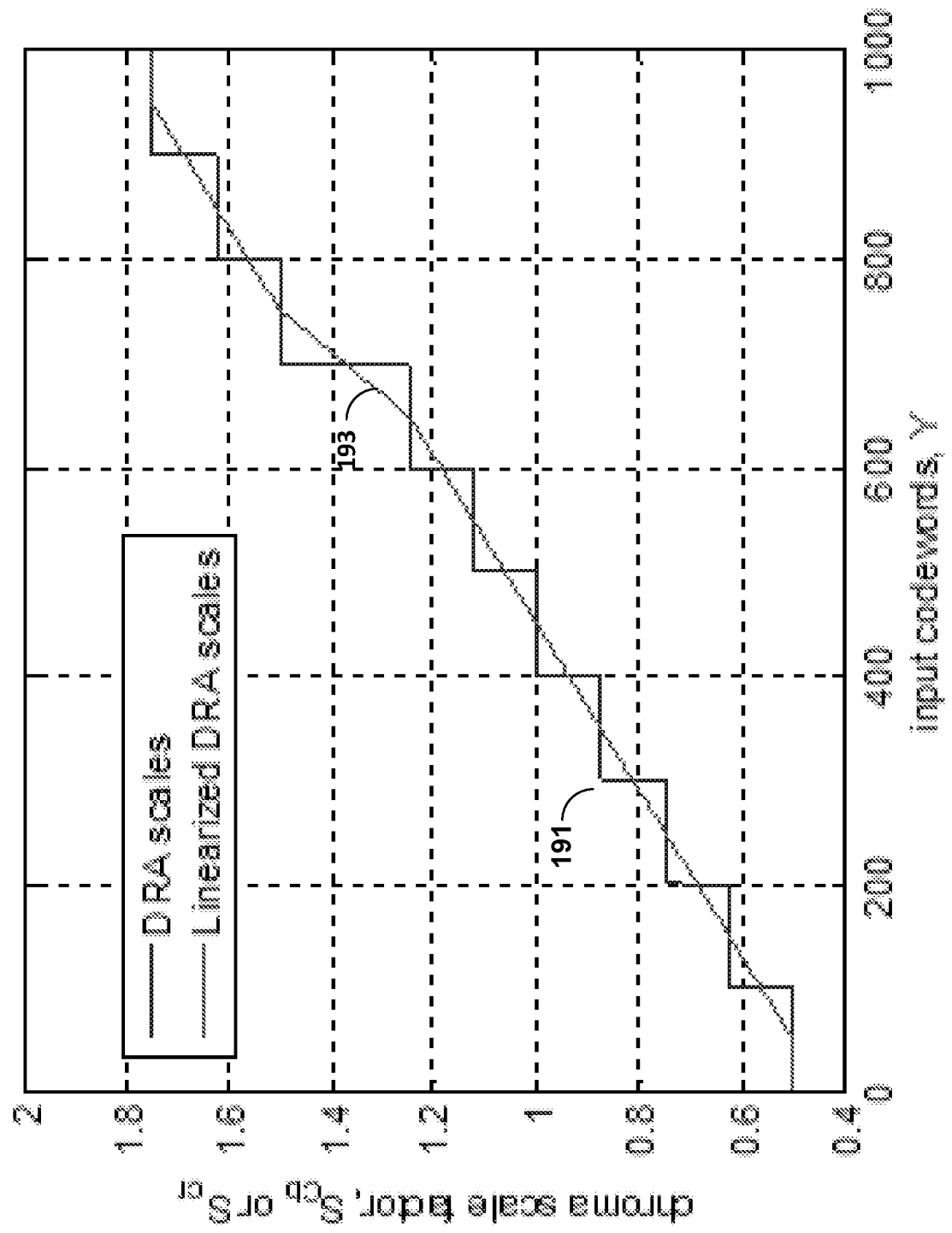
FIG. 14 shows an example of linearization of DRA scaling parameters.

Since the DRA function Sy is defined with an equal scale for all Y samples of the subrange i, the derived LCS features a discontinuous function (e.g., step-function) characteristic, shown in plot 191 of FIG. 14. In some examples, video pre-processor unit 19 may derive LCS functions $S_{Cb}$ or $S_{Cr}$ with a linearization of the scale factors utilized for the DRA function of the luma (shown as curve 193 in FIG. 14).

$$S_{Cb}(Y) = S_{Cr}(Y) = \text{fun}(S_y(Y)) \quad (29)$$

In some examples, the linearization fun($S_y$(Y)) can be conducted by local approximation of the scale parameters over neighboring partitions i and i+1, as follows.

For i=0 . . . N−2, derive the size of neighboring subranges:

$$Di = (yi+1-1-yi)$$

$$Di+1 = (yi+2-1-yi+1) \quad (30)$$

Define the approximation subranges Rci for the LCS function as a half-range shifted to subranges Ri of the DRA function:

$$Yci = yi + Di/2$$

$$Yc+1 = yi+1 + Di+½ \quad (31)$$

Video pre-processor unit 19 may derive the LCS scale factors for Y=Yci . . . Yc+1−1 as a linear interpolation of the DRA scales factors of neighboring subranges:

$$\text{localScale} = (Yci+1-Yci)/(Yci+1-Yci)$$

$$Scb(Y) = Scr(Y) = Sy(Yci) + (Y-Yci) * \text{localScale} \quad (32)$$

Again, an example of such a linearized LCS function is shown as plot 193 in FIG. 14.

In another example, video pre-processor unit 19 may derive parameters of the LCS function $S_{Cb}$ or $S_{Cr}$ from parameters of the DRA function applied to the Y component Scy and quantization parameters of the codec, such as a QP, deltaQP, and/or chromaQP parameter.

An adjustment to LCS parameters {lcs_param1, lcs_param2, lcs_param3} proportional to the quantization parameters (e.g., QP) utilized for coding of the current picture/slice or transform block may be utilized in the approximation of the LCS from Luma DRA scaling function Sy, and removal of its discontinuous function nature.

For example, the interpolation of the chroma scale function for the range [Yci . . . Yci+1], which is shown in Equation (33), can be conducted through a sigmoid function being adjusted as a function of QP. An example is shown below.

For values Y=Yci . . . Yc+1−1, a sigmoid function can be used for interpolation between scales of neighboring ranges:

$$Scb(Y)=lcs\_param1+lcs\_param2./(1.0+\exp(-lcs\_param3*Y)) \quad (33)$$

In yet another example, an adaptive smooth-discontinuous function or its approximations can be used for interpolation.

With this approach, controlled smoothness can be introduced to the discontinuous function of the LCS function in the case of differences between scales of the neighboring sub-ranges. A set of smoothing functions can be provided to the decoder-side (e.g., video decoder 30 and/or video post-processor unit 31) as side information, and selection of the function id can be signaled in the bitstream. Alternatively, a smoothing function can be signaled in the bitstream.

Derivation of the smoothing function can be also tabulated in the form of a relationship between a QP and parameters of a smoothing function or function id, as shown in the below.

| QP | Function ID | {lcs_param} | {lcs_param} | {lcs_param} |
|---|---|---|---|---|
| 23 | i | lcs_param1(i) | lcs_param2(i) | lcs_param3(i) |
| . . . | | | | |
| 52 | M-1 | lcs_param1(M-1) | lcs_param2(M-1) | lcs_param3(M-1) |

Figure 15:
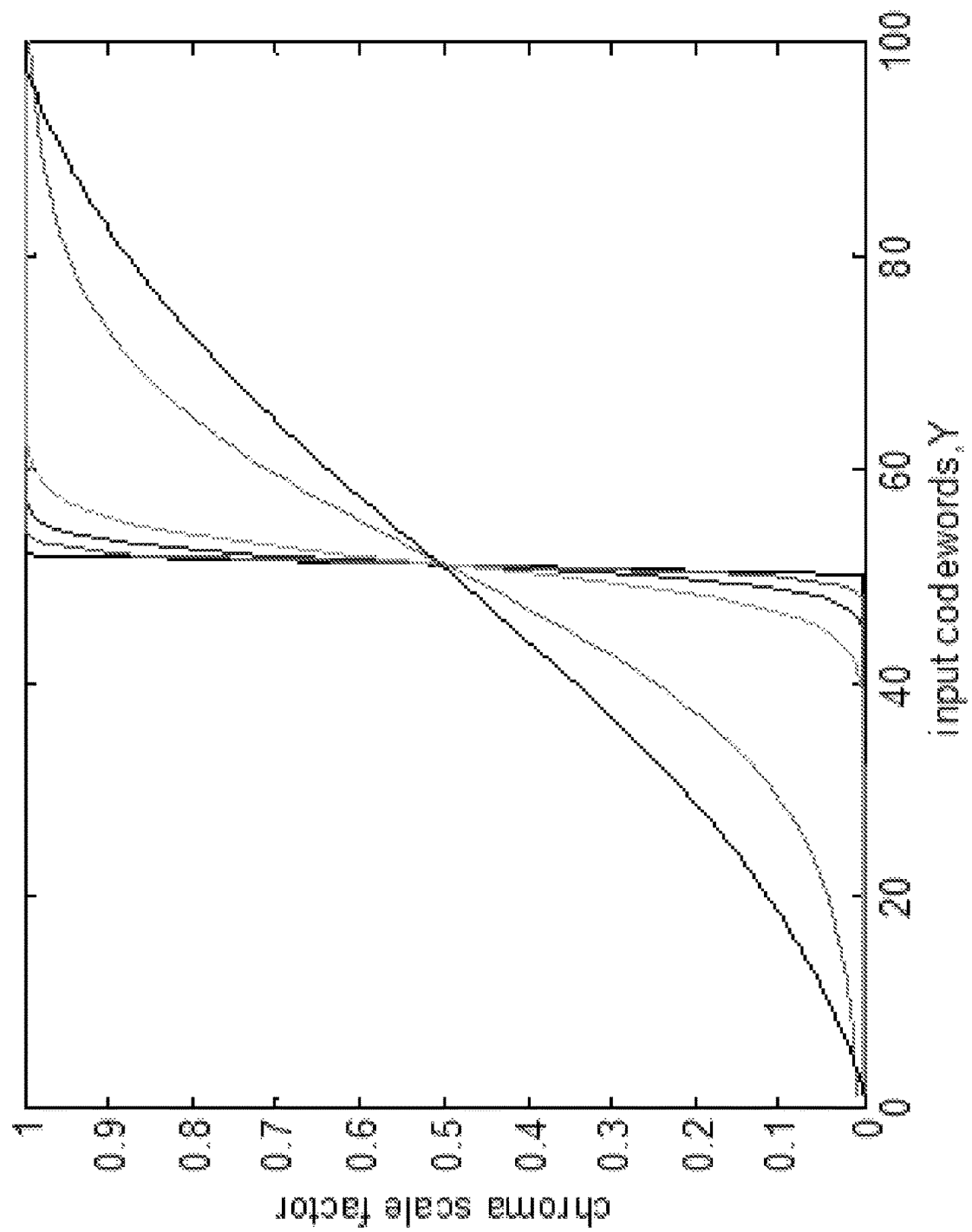
FIG. 15 shows an example of a set of sigmoid functions.

FIG. 15 shows an example of the use of a set of sigmoid functions to provide a controlled smoothness of the discontinuous function to Scb (or Cr) at the border of two neighboring subranges.

Figure 16:
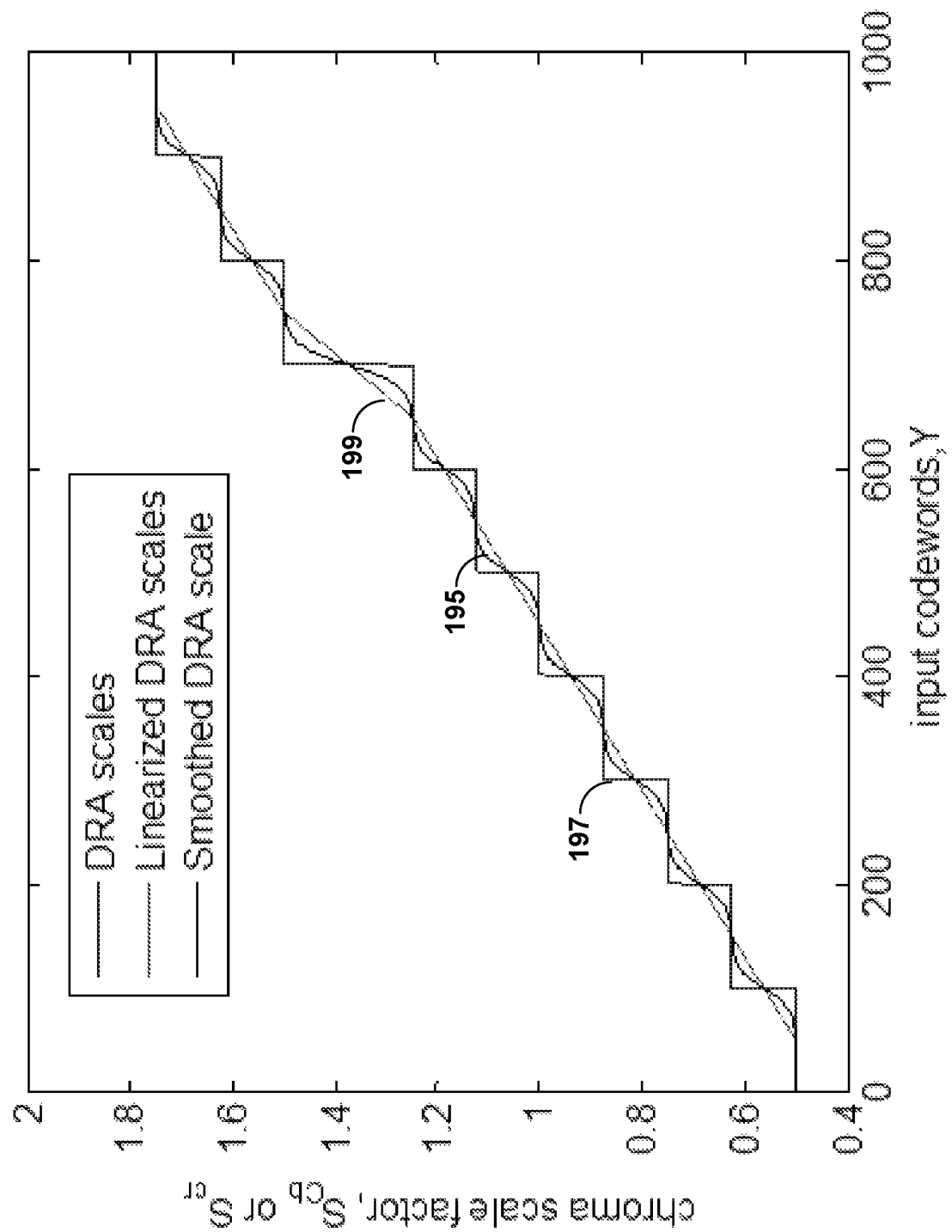
FIG. 16 shows an example of smoothing of DRA scaling parameters.

An example of an application controlled smoothness function for the derivation of the LCS function with Equation (33) is shown as plot 195 (smoothed DRA scales) in FIG. 16. Plot 197 shows the original DRA scales and plot 199 shows linearized DRA scales. Plot 195 (smoothed DRA curve) may be produced with lcs_param1(i)=0, lcs_param2(i)=Sci+1−Sci, and lcs_param3(i)=0.1.

In some examples, the LCS function Scb (or Scr) can be further adapted to colorimetry properties as shown in Equation (26).

Define the properties of target container primeT and native color gamut primeN through coordinates of primaries colors: primeT=(xRc,yRc; xGc,yGc; xBc, yBc), primeN=(xRn,yRn; xGn,yGn; xBn, yBn), and white point coordinate whiteP=(xW,yW). Examples for some colors are given in Table 1. With this, $$rdT=\text{sqrt}((primeT(1,1)-whiteP(1,1))^2+(primeN(1,2)-whiteP(1,2))^2)$$

$$gdT=\text{sqrt}((primeT(2,1)-whiteP(1,1))^2+(primeN(2,2)-whiteP(1,2))^2)$$

$$bdT=\text{sqrt}((primeT(3,1)-whiteP(1,1))^2+(primeN(3,2)-whiteP(1,2))^2)$$

$$rdN=\text{sqrt}((primeN(1,1)-whiteP(1,1))^2+(primeN(1,2)-whiteP(1,2))^2)$$

$$gdN=\text{sqrt}((primeN(2,1)-whiteP(1,1))^2+(primeN(2,2)-whiteP(1,2))^2)$$

$$bdN=\text{sqrt}((primeN(3,1)-whiteP(1,1))^2+(primeN(3,2)-whiteP(1,2))^2)$$

$$\alpha=\text{sqrt}((bdT/bdN)^2)$$

$$\beta=\text{sqrt}((rdT/rdN)^2+(gdT/gdN)^2)$$

In another example, the value of the alpha and beta multipliers can be derived from QP-like parameters that adjust the quantization scheme of the codec for a color container of the coded video:

$$\alpha=2.^{\char`\^}(\text{delta}CbQP./6-1)$$

$$\beta=2.^{\char`\^}(\text{delta}CrQP./6-1)$$

where deltaCrQP/deltaCbQP is an adjustment to the QP settings of the codec to meet properties of the color container.

In some examples, parameters of the techniques described above may be estimated at the encoder side (e.g., video encoder 20 and/or video pre-processor unit 19) and signaled through a bitstream (metadata, SEI message, VUI, or SPS/PPS or slice header, etc.). Video decoder 30 and/or video post-processor unit 31 receives parameters from a bitstream.

In some examples, parameters of the techniques described above are derived at both video encoder 20/video pre-processor unit 19 and video decoder 30/video post-processor unit 31 through a specified process from the input signal or from other available parameters associated with the input signal and processing flow.

In some examples, parameters of the techniques described above are signaled explicitly and are sufficient for performing the DRA at video decoder 30/video post-processor unit 31. In yet other examples, parameters of the techniques described above are derived from other input signal parameters, e.g., parameters of the input color gamut and target color container (color primaries).

Figure 17:
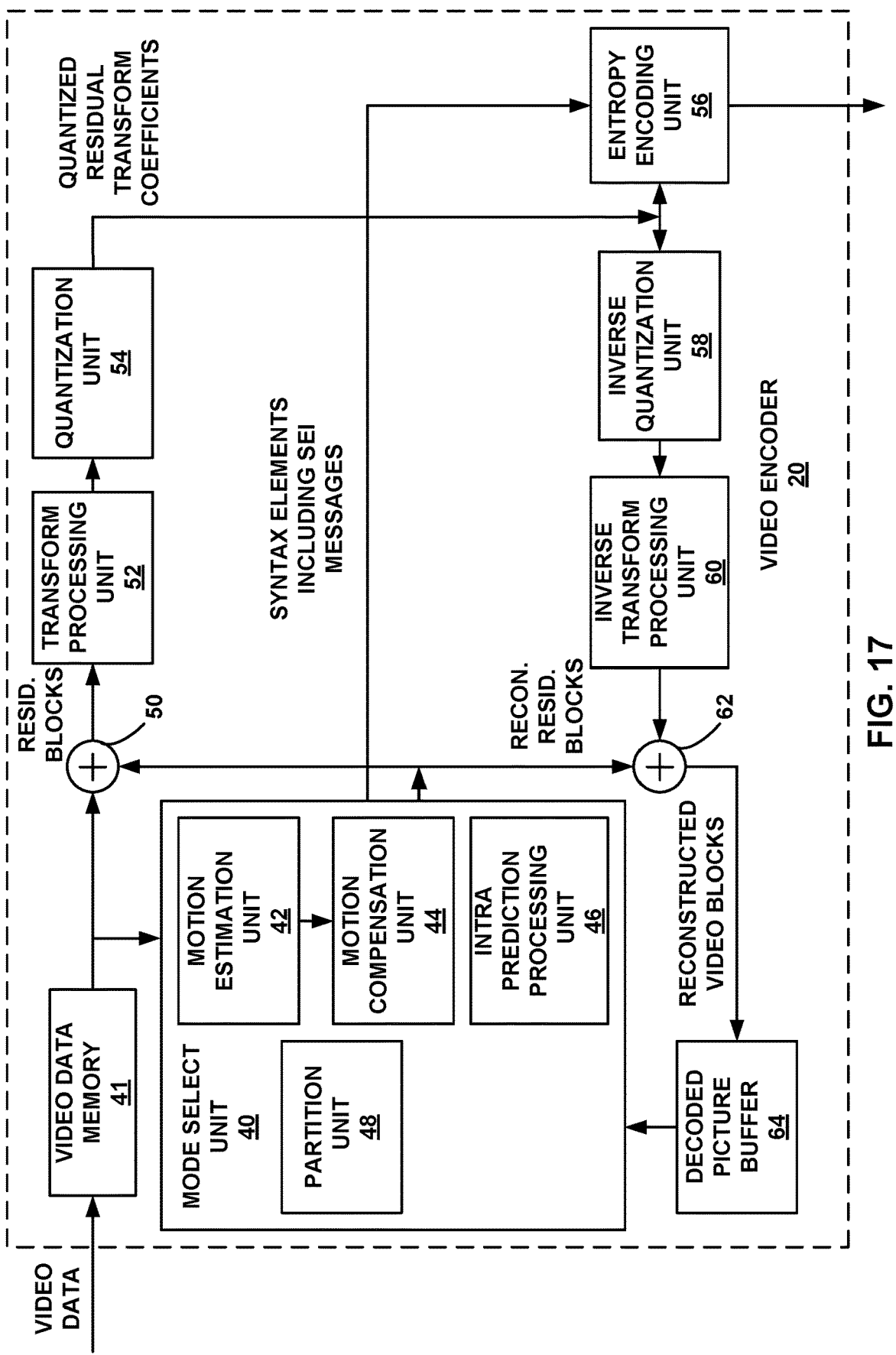
FIG. 17 is a block diagram illustrating an example of a video encoder that may implement techniques of this disclosure.

FIG. 17 is a block diagram illustrating an example of video encoder 20 that may implement the techniques of this disclosure. As described above, the DRA techniques may be performed by video pre-processor unit 19 outside of the encoding loop of video encoder 20 or within the encoding loop of video encoder 20 (e.g., before prediction). Video encoder 20 may perform intra- and inter-coding of video blocks within video slices in a target color container that have been processed by video pre-processor unit 19. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 17, video encoder 20 receives a current video block within a video frame to be encoded. In the example of FIG. 17, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 17) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree and/or QTBT data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 18:
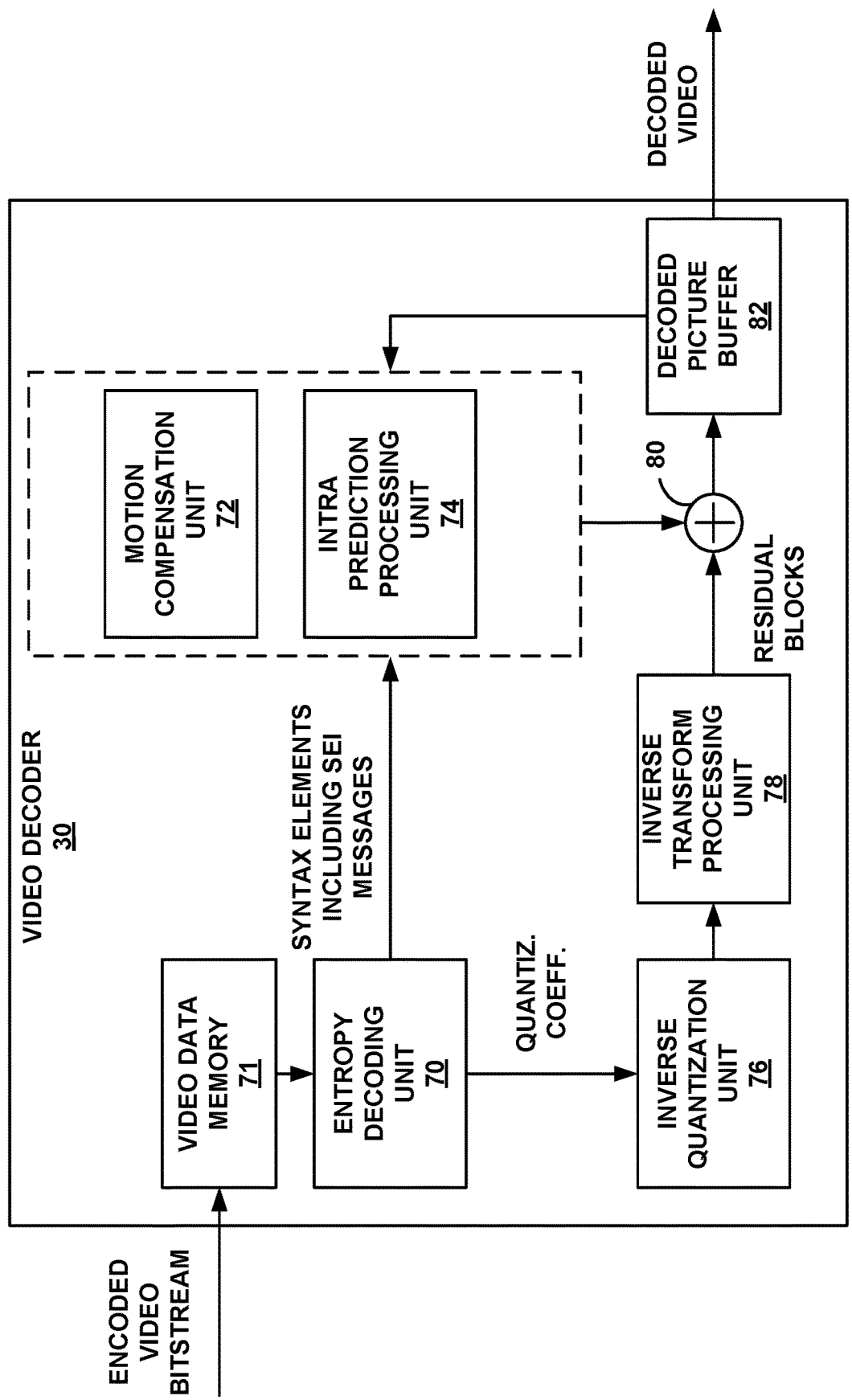
FIG. 18 is a block diagram illustrating an example of a video decoder that may implement techniques of this disclosure.

FIG. 18 is a block diagram illustrating an example of video decoder 30 that may implement the techniques of this disclosure. As described above, the inverse DRA techniques may be performed by video post-processor unit 31 outside of the decoding loop of video decoder 30 or within the decoding loop of video decoder 30 (e.g., after filtering and before decoded picture buffer 82). In the example of FIG. 18, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 17). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Figure 19:
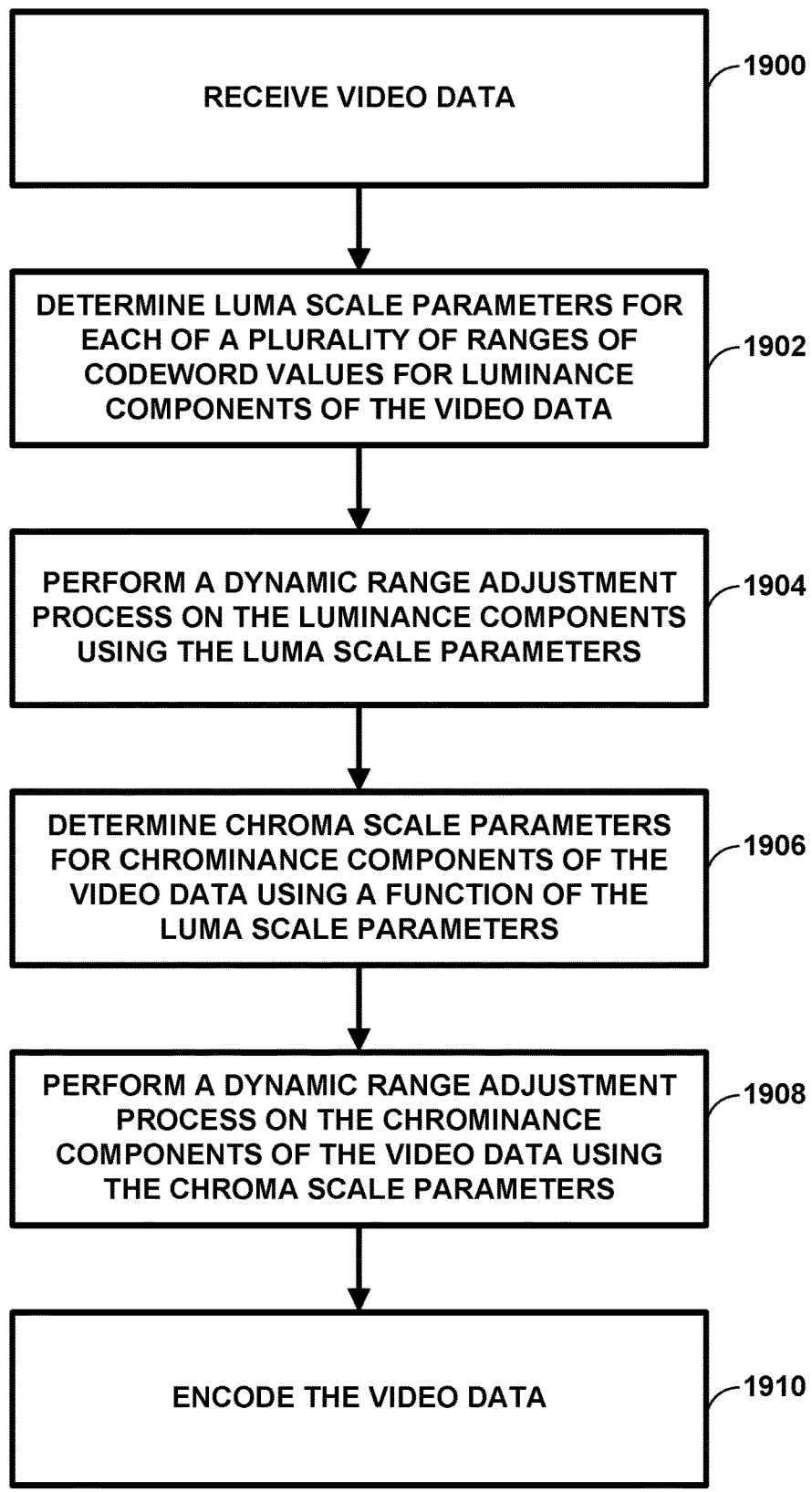
FIG. 19 is a flowchart showing one example video processing technique of the disclosure.

FIG. 19 is a flowchart showing one example video processing technique of the disclosure. The techniques of FIG. 19 may be performed by video pre-processor unit 19 and/or video encoder 20, as described above. In one example of the disclosure, video pre-processor unit 19 and/or video encoder 20 may be configured to receive video data (1900), determine luma scale parameters for each of a plurality of ranges of codeword values for luminance components of the video data (1902), and perform a dynamic range adjustment process on the luminance components using the luma scale parameters (1904). Video pre-processor unit 19 and/or video encoder 20 may be further configured to determine chroma scale parameters for chrominance components of the video data using a function of the luma scale parameters (1906), and perform a dynamic range adjustment process on the chrominance components of the video data using the chroma scale parameters (1908). Video encoder 20 may then be configured to encode the video data (1910).

In one example, to determine the chroma scale parameters, video pre-processor unit 19 and/or video encoder 20 are further configured to determine chroma scale parameters for chrominance components associated with luminance components having a first range of codeword values of the plurality of ranges of codeword values using a function of the luma scale parameters determined for the luminance components having the first range of codeword values.

In another example, to determine the chroma scale parameters, video pre-processor unit 19 and/or video encoder 20 are further configured to determine chroma scale parameters for chrominance components associated with luminance components having a first range of codeword values and a second range of codeword values of the plurality of ranges of codeword values using a function of the luma scale parameters determined for the luminance components having the first range of codeword values and the second range of codeword values.

In another example, the luma scale parameters for each of the plurality of ranges of codeword value for the luminance components are represented by a discontinuous function, and video pre-processor unit 19 and/or video encoder 20 are further configured to apply a linearization process to the discontinuous function to produce linearized luma scale parameters, and determine the chroma scale parameters for the chrominance components of the video data using a function of the linearized luma scale parameters. In one example, the linearization process is one or more of a linear interpolation process, a curve fitting process, an averaging process, or a higher order approximation process.

In another example, to determine the chroma scale parameters, video pre-processor unit 19 and/or video encoder 20 are further configured to determine the chroma scale parameters for the chrominance components of the video data using a function of the luma scale parameters and a quantization parameter used to decode the chrominance components.

In another example, to determine the chroma scale parameters, video pre-processor unit 19 and/or video encoder 20 are further configured to determine the chroma scale parameters for the chrominance components of the video data using a function of the luma scale parameters, the quantization parameter used to decode the chrominance components, and a color representation parameter derived from characteristics of the chroma component of the video data. In one example, the color representation includes a transfer function associated with the color container/video data.

In another example, video pre-processor unit 19 and/or video encoder 20 are further configured to determine initial chroma scale parameters for the chrominance components of the video data, wherein to determine the chroma scale parameters, video pre-processor unit 19 and/or video encoder 20 are further configured to determine the chroma scale parameters for the chrominance components of the video data using a function of the luma scale parameters and the initial chroma scale parameters.

In another example, video pre-processor unit 19 and/or video encoder 20 determine luma offset parameters for the luminance components, perform the dynamic range adjustment process on the luminance components using the luma scale parameters and the luma offset parameters, determine chroma offset parameters for the chrominance components, and perform the dynamic range adjustment process on the chrominance components of the video data using the chroma scale parameters and the chroma offset parameters.

Figure 20:
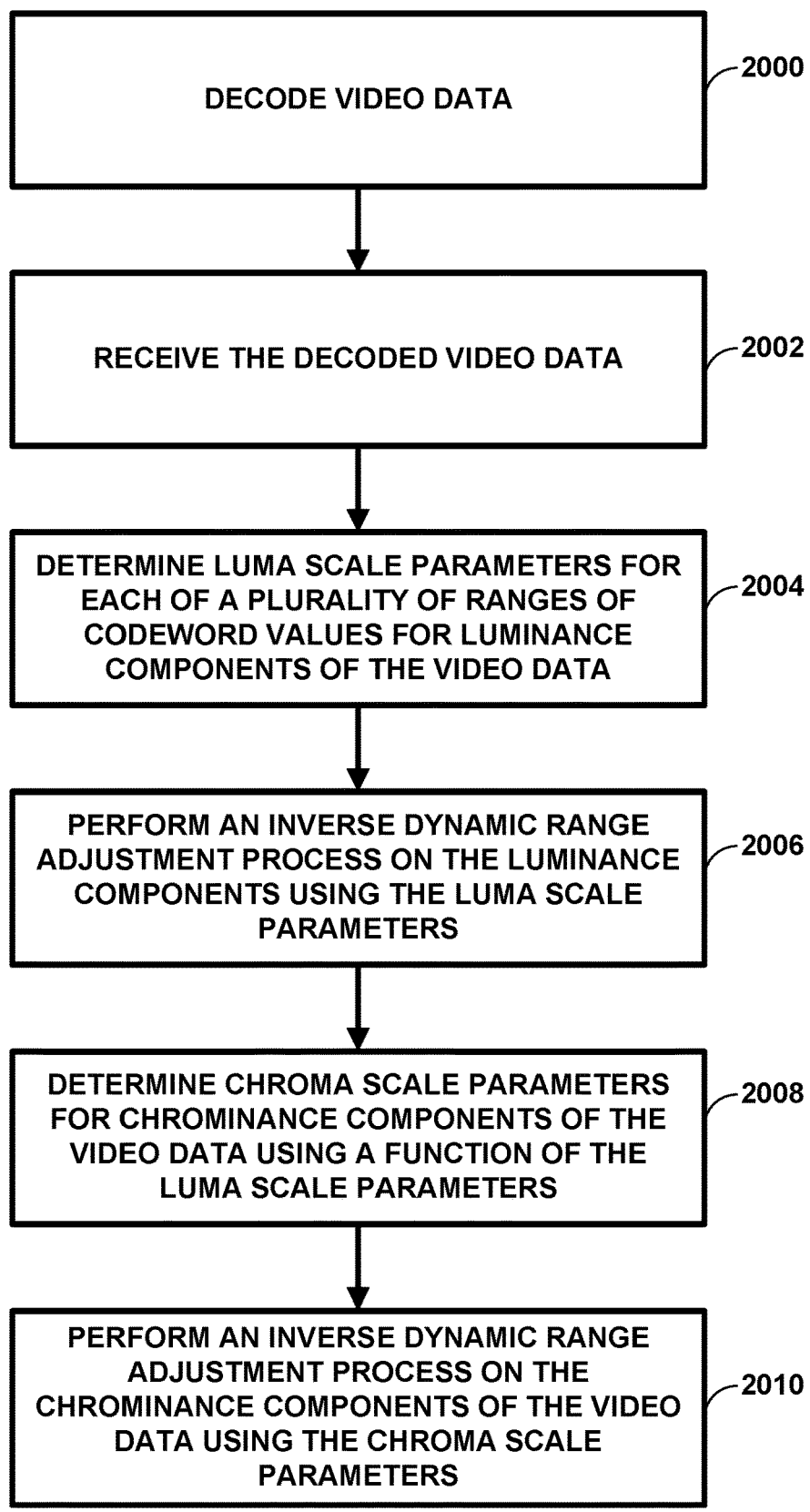
FIG. 20 is a flowchart showing another example video processing technique of the disclosure.

FIG. 20 is a flowchart showing another example video processing technique of the disclosure. The techniques of FIG. 20 may be performed by video post-processor unit 31 and/or video decoder 30, as described above. In one example of the disclosure, video decoder 30 may be configured to decode video data (2000) and video post-processor unit 31 and/or video decoder 30 may be configured to receive the video data (2002). Video post-processor unit 31 and/or video decoder 30 may be further configured to determine luma scale parameters for each of a plurality of ranges of codeword values for luminance components of the video data (2004), and perform an inverse dynamic range adjustment process on the luminance components using the luma scale parameters (2006). Video post-processor unit 31 and/or video decoder 30 may be further configured to determine chroma scale parameters for chrominance components of the video data using a function of the luma scale parameters (2008), and perform an inverse dynamic range adjustment process on the chrominance components of the video data using the chroma scale parameters (2010).

In one example, to determine the chroma scale parameters, video post-processor unit 31 and/or video decoder 30 are further configured to determine chroma scale parameters for chrominance components associated with luminance components having a first range of codeword values of the plurality of ranges of codeword values using a function of the luma scale parameters determined for the luminance components having the first range of codeword values.

In another example, to determine the chroma scale parameters, video post-processor unit 31 and/or video decoder 30 are further configured to determine chroma scale parameters for chrominance components associated with luminance components having a first range of codeword values and a second range of codeword values of the plurality of ranges of codeword values using a function of the luma scale parameters determined for the luminance components having the first range of codeword values and the second range of codeword values.

In another example, the luma scale parameters for each of the plurality of ranges of codeword value for the luminance components are represented by a discontinuous function, and video post-processor unit 31 and/or video decoder 30 are further configured to apply a linearization process to the discontinuous function to produce linearized luma scale parameters, and determine the chroma scale parameters for the chrominance components of the video data using a function of the linearized luma scale parameters. In one example, the linearization process is one or more of a linear interpolation process, a curve fitting process, an averaging process, or a higher order approximation process.

In another example, to determine the chroma scale parameters, video post-processor unit 31 and/or video decoder 30 are further configured to determine the chroma scale parameters for the chrominance components of the video data using a function of the luma scale parameters and a quantization parameter used to decode the chrominance components.

In another example, to determine the chroma scale parameters, video post-processor unit 31 and/or video decoder 30 are further configured to determine the chroma scale parameters for the chrominance components of the video data using a function of the luma scale parameters, the quantization parameter used to decode the chrominance components, and a color representation parameter derived from characteristics of the chroma component of the video data. In one example, the color representation parameter includes a transfer function associated with the color container/video data.

In another example, video post-processor unit 31 and/or video decoder 30 are further configured to determine initial chroma scale parameters for the chrominance components of the video data, wherein to determine the chroma scale parameters, video post-processor unit 31 and/or video decoder 30 are further configured to determine the chroma scale parameters for the chrominance components of the video data using a function of the luma scale parameters and the initial chroma scale parameters.

In another example, video post-processor unit 31 and/or video decoder 30 determine luma offset parameters for the luminance components, perform the inverse dynamic range adjustment process on the luminance components using the luma scale parameters and the luma offset parameters, determine chroma offset parameters for the chrominance components, and perform the inverse dynamic range adjustment process on the chrominance components of the video data using the chroma scale parameters and the chroma offset parameters.

Certain aspects of this disclosure have been described with respect to HEVC, extensions of the HEVC, JEM, and VVC standards for purposes of illustration. However, the techniques described in this disclosure may be useful for other video coding processes, including other standard or proprietary video coding processes under development or not yet developed, including VVC.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving video data;
   determining luma scale parameters for each of a plurality of ranges of codeword values for luminance components of the video data;
   performing a dynamic range adjustment process on the luminance components using the luma scale parameters;
   determining chroma scale parameters for chrominance components of the video data using a function of the luma scale parameters and a quantization parameter used to code the chrominance components; and
   performing a dynamic range adjustment process on the chrominance components of the video data using the chroma scale parameters.

2. The method of claim 1, wherein determining the chroma scale parameters comprises:
   determining chroma scale parameters for chrominance components associated with luminance components having a first range of codeword values of the plurality of ranges of codeword values using a function of the luma scale parameters determined for the luminance components having the first range of codeword values and the quantization parameter used to code the chrominance components.

3. The method of claim 1, wherein determining the chroma scale parameters comprises:
   determining chroma scale parameters for chrominance components associated with luminance components having a first range of codeword values and a second range of codeword values of the plurality of ranges of codeword values using a function of the luma scale parameters determined for the luminance components having the first range of codeword values and the second range of codeword values and the quantization parameter used to code the chrominance components.

4. The method of claim 1, wherein the luma scale parameters for each of the plurality of ranges of codeword value for the luminance components are represented by a discontinuous function, the method further comprising:
   applying a linearization process to the discontinuous function to produce linearized luma scale parameters; and
   determining the chroma scale parameters for the chrominance components of the video data using a function of the linearized luma scale parameters and the quantization parameter used to code the chrominance components.

5. The method of claim 4, wherein the linearization process is one or more of a linear interpolation process, a curve fitting process, an averaging process, a low pass filtering process, or a higher order approximation process.

6. The method of claim 1, wherein determining the chroma scale parameters further comprises:
   determining the chroma scale parameters for the chrominance components of the video data using a function of the luma scale parameters, the quantization parameter used to code the chrominance components, and a color representation parameter derived from characteristics of the chrominance component of the video data.

7. The method of claim 6, wherein the color representation parameter includes a transfer function associated with the video data.

8. The method of claim 1, further comprising:
   determining initial chroma scale parameters for the chrominance components of the video data,
   wherein determining the chroma scale parameters comprises determining the chroma scale parameters for the chrominance components of the video data using a function of the luma scale parameters, the quantization parameter used to code the chrominance components, and the initial chroma scale parameters.

9. The method of claim 1, further comprising:
   determining luma offset parameters for the luminance components;
   performing the dynamic range adjustment process on the luminance components using the luma scale parameters and the luma offset parameters;
   determining chroma offset parameters for the chrominance components; and
   performing the dynamic range adjustment process on the chrominance components of the video data using the chroma scale parameters and the chroma offset parameters.

10. The method of claim 1, further comprising:
encoding the video data after performing the dynamic range adjustment process on the luminance components and after performing the dynamic range adjustment process on the chrominance components; and
outputting the encoded video data.

11. The method of claim 1, wherein the dynamic range adjustment process is an inverse dynamic range adjustment process, the method further comprising:
decoding the video data before performing the inverse dynamic range adjustment process on the luminance components and before performing the inverse dynamic range adjustment process on the chrominance components; and
displaying outputted decoded video data.

12. An apparatus configured to process video data, the apparatus comprising:
a memory configured to store the video data; and
one or more processors in communication with the memory, the one or more processors configured to:
receive the video data;
determine luma scale parameters for each of a plurality of ranges of codeword values for luminance components of the video data;
perform a dynamic range adjustment process on the luminance components using the luma scale parameters;
determine chroma scale parameters for chrominance components of the video data using a function of the luma scale parameters and a quantization parameter used to code the chrominance components; and
perform a dynamic range adjustment process on the chrominance components of the video data using the chroma scale parameters.

13. The apparatus of claim 12, wherein to determine the chroma scale parameters, the one or more processors are further configured to:
determine chroma scale parameters for chrominance components associated with luminance components having a first range of codeword values of the plurality of ranges of codeword values using a function of the luma scale parameters determined for the luminance components having the first range of codeword values and the quantization parameter used to code the chrominance components.

14. The apparatus of claim 12, wherein to determine the chroma scale parameters, the one or more processors are further configured to:
determine chroma scale parameters for chrominance components associated with luminance components having a first range of codeword values and a second range of codeword values of the plurality of ranges of codeword values using a function of the luma scale parameters determined for the luminance components having the first range of codeword values and the second range of codeword values and the quantization parameter used to code the chrominance components.

15. The apparatus of claim 12, wherein the luma scale parameters for each of the plurality of ranges of codeword value for the luminance components are represented by a discontinuous function, and wherein the one or more processors are further configured to:
apply a linearization process to the discontinuous function to produce linearized luma scale parameters; and
determine the chroma scale parameters for the chrominance components of the video data using a function of the linearized luma scale parameters and the quantization parameter used to code the chrominance components.

16. The apparatus of claim 15, wherein the linearization process is one or more of a linear interpolation process, a curve fitting process, an averaging process, a low pass filtering process, or a higher order approximation process.

17. The apparatus of claim 12, wherein to determine the chroma scale parameters further, the one or more processors are further configured to:
determine the chroma scale parameters for the chrominance components of the video data using a function of the luma scale parameters, the quantization parameter used to code the chrominance components, and a color representation parameter derived from characteristics of the chrominance component of the video data.

18. The apparatus of claim 17, wherein the color representation parameter includes a transfer function associated with the video data.

19. The apparatus of claim 12, wherein the one or more processors are further configured to:
determine initial chroma scale parameters for the chrominance components of the video data,
wherein to determine the chroma scale parameters, the one or more processors are further configured to determine the chroma scale parameters for the chrominance components of the video data using a function of the luma scale parameters, the quantization parameter used to code the chrominance components, and the initial chroma scale parameters.

20. The apparatus of claim 12, wherein the one or more processors are further configured to:
determine luma offset parameters for the luminance components;
perform the dynamic range adjustment process on the luminance components using the luma scale parameters and the luma offset parameters;
determine chroma offset parameters for the chrominance components; and
perform the dynamic range adjustment process on the chrominance components of the video data using the chroma scale parameters and the chroma offset parameters.

21. The apparatus of claim 12, wherein the one or more processors are further configured to:
encode the video data after performing the dynamic range adjustment process on the luminance components and after performing the dynamic range adjustment process on the chrominance components; and
output the encoded video data.

22. The apparatus of claim 21, further comprising:
a camera configured to capture the video data.

23. The apparatus of claim 12, wherein the dynamic range adjustment process is an inverse dynamic range adjustment process, wherein the one or more processors are further configured to:
decode the video data before performing the inverse dynamic range adjustment process on the luminance components and before performing the inverse dynamic range adjustment process on the chrominance components.

24. The apparatus of claim 23, further comprising:
a display configured to display the video data after performing the inverse dynamic range adjustment process on the luminance components and after performing the inverse dynamic range adjustment process on the chrominance components.

25. An apparatus configured to process video data, the apparatus comprising:
- means for receiving video data;
- means for determining luma scale parameters for each of a plurality of ranges of codeword values for luminance components of the video data;
- means for performing a dynamic range adjustment process on the luminance components using the luma scale parameters;
- means for determining chroma scale parameters for chrominance components of the video data using a function of the luma scale parameters and a quantization parameter used to code the chrominance components; and
- means for performing a dynamic range adjustment process on the chrominance components of the video data using the chroma scale parameters.

26. The apparatus of claim 25, wherein the luma scale parameters for each of the plurality of ranges of codeword value for the luminance components are represented by a discontinuous function, the apparatus further comprising:
- means for applying a linearization process to the discontinuous function to produce linearized luma scale parameters; and
- means for determining the chroma scale parameters for the chrominance components of the video data using a function of the linearized luma scale parameters and the quantization parameter used to code the chrominance components.

27. A non-transitory computer-readable storage medium storing instructions that, when executed, causes one or more processors of a device configured to process video data to:
- receive the video data;
- determine luma scale parameters for each of a plurality of ranges of codeword values for luminance components of the video data;
- perform a dynamic range adjustment process on the luminance components using the luma scale parameters;
- determine chroma scale parameters for chrominance components of the video data using a function of the luma scale parameters and a quantization parameter used to code the chrominance components; and
- perform a dynamic range adjustment process on the chrominance components of the video data using the chroma scale parameters.

28. The non-transitory computer-readable storage medium of claim 27, wherein the luma scale parameters for each of the plurality of ranges of codeword value for the luminance components are represented by a discontinuous function, and wherein the instructions further cause the one or more processors to:
- apply a linearization process to the discontinuous function to produce linearized luma scale parameters; and
- determine the chroma scale parameters for the chrominance components of the video data using a function of the linearized luma scale parameters and the quantization parameter used to code the chrominance components.

\* \* \* \* \*